US009854586B2

United States Patent
Zheng et al.

(10) Patent No.: US 9,854,586 B2
(45) Date of Patent: Dec. 26, 2017

(54) METHOD AND APPARATUS FOR SUPPORTING USER EQUIPMENT IN TASK EXECUTION

(71) Applicant: Huawei Technologies Co., Ltd., Shenzhen, Guangdong (CN)

(72) Inventors: Juan Zheng, Beijing (CN); Sha Ma, Beijing (CN); Qiang Li, Doha (QA); Yuan Xia, Beijing (CN); Zhiyu Yan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 15/081,571

(22) Filed: Mar. 25, 2016

(65) Prior Publication Data
US 2016/0212650 A1   Jul. 21, 2016

Related U.S. Application Data

(63) Continuation of application No. PCT/CN2013/084476, filed on Sep. 27, 2013.

(51) Int. Cl.
*H04W 72/04* (2009.01)
*H04W 48/20* (2009.01)
(Continued)

(52) U.S. Cl.
CPC ....... *H04W 72/0486* (2013.01); *H04W 24/02* (2013.01); *H04W 24/10* (2013.01);
(Continued)

(58) Field of Classification Search
CPC ............. H04W 48/20; H04W 72/0486; H04W 52/146; H04B 7/024; H04B 17/24; H04B 17/382
See application file for complete search history.

(56) References Cited

U.S. PATENT DOCUMENTS 8,897,253 B2 * 11/2014 Shin ................. H04L 5/001
370/329
2002/0145932 A1 * 10/2002 Nguyen ............... G11C 7/22
365/227
(Continued)

FOREIGN PATENT DOCUMENTS

| CN | 102123447 A | 7/2011 |
| CN | 102160323 A | 8/2011 |
| CN | 103139832 A | 6/2013 |

OTHER PUBLICATIONS

Huawei, HiSilicon, Enhancements of small cell on/off, 3GPP TSG RAN WG1 Meeting #74, Aug. 19-23, 2013, 7 pages, R1-132888.
(Continued)

*Primary Examiner* — Raj Jain

(57) ABSTRACT

The present invention relates to a method and an apparatus for supporting user equipment in task execution, which are used to resolve a problem that a result of measurement and/or synchronization performed by user equipment is erroneous. In the method, a first network-side device acquires duration of a cell working state, where the duration of the cell working state includes duration for which a cell performs signal sending and/or duration for which the cell does not perform signal sending; and the first network-side device determines a time for user equipment to perform measurement and/or synchronization, where the time for the user equipment to perform measurement is within a range of duration for which a to-be-measured cell performs signal sending, and the time for the user equipment to perform synchronization is within a range of duration for which a serving cell performs signal sending.

19 Claims, 9 Drawing Sheets

(51) Int. Cl.
*H04W 24/02* (2009.01)
*H04W 24/10* (2009.01)
*H04W 56/00* (2009.01)
*H04W 72/12* (2009.01)
*H04W 76/04* (2009.01)
*H04W 48/12* (2009.01)
*H04W 84/04* (2009.01)

(52) U.S. Cl.
CPC ......... *H04W 48/20* (2013.01); *H04W 56/001* (2013.01); *H04W 72/12* (2013.01); *H04W 76/048* (2013.01); *H04W 48/12* (2013.01); *H04W 84/045* (2013.01)

(56) References Cited

U.S. PATENT DOCUMENTS

| | | | |
|---|---|---|---|
| 2011/0212742 A1 | 9/2011 | Chen et al. | |
| 2012/0129517 A1* | 5/2012 | Fox | H04L 41/5025 455/425 |
| 2012/0320775 A1* | 12/2012 | Lee | H04B 7/024 370/252 |
| 2013/0170418 A1 | 7/2013 | Stauffer et al. | |
| 2014/0273872 A1 | 9/2014 | Levy et al. | |
| 2015/0208259 A1* | 7/2015 | Ouchi | H04W 48/16 370/252 |
| 2016/0174150 A1* | 6/2016 | Comsa | H04W 36/0094 370/311 |
| 2016/0192432 A1* | 6/2016 | Maeda | H04W 52/0206 455/418 |
| 2016/0212650 A1* | 7/2016 | Zheng | H04W 24/10 |

OTHER PUBLICATIONS

"Small cell discovery", Qualcomm Incorporated, 3GPP TSG-RAN WG1 #72bis, Apr. 15-19, 2013, 3 pages, R1-131408.
"3rd Generation Partnership Project; Technical Specification Group Radio Access Network; Small cell enhancements for E-UTRA and E-UTRAN—Physical layer aspects (Release 12)", 3GPP TR 36.872 V12.0.0, Sep. 2013, 78 pages.
"Views on Small Cell On/Off Mechanisms", NTT Docomo, 3GPP TSG RAN WG1 Meeting #74, Aug. 19-23, 2013, 7 pages, R1-133456.
"Small Cell Discovery for Efficient Small Cell On/Off Operation", NTT Docomo, 3GPP TSG RAN WG1 Meeting #74, Aug. 19-23, 2013, 8 pages, R1-133457.
"Small cell on/off", Qualcomm Incorporated, 3GPP TSG-RAN WG1 #74, Aug. 19-23, 2013, 3 pages, R1-133590.

\* cited by examiner

METHOD AND APPARATUS FOR SUPPORTING USER EQUIPMENT IN TASK EXECUTION

CROSS-REFERENCE TO RELATED APPLICATIONS

This application is a continuation of International Application No. PCT/CN2013/084476, filed on Sep. 27, 2013, which is hereby incorporated by reference in its entirety.

TECHNICAL FIELD

The present invention relates to the field of mobile communications technologies, and in particular, to a method and an apparatus for supporting user equipment in task execution.

BACKGROUND

With rapid development of mobile communications technologies, demand for mobile service traffic becomes larger. To satisfy the fast-growing demand for service traffic, data offloading may be performed on a macro cellular network, and small cells are densely deployed in some indoor or outdoor hot spots. The small cells herein may include: a metro cell, a micro cell, a pico cell, a femto cell, a wireless local area network (WLAN) using a Wireless Fidelity (Wi-Fi) technology, and the like. These small cells have features of small coverage and low transmit power, and are applicable for high-speed data transmission services.

Due to small coverage of a small cell, a service volume of user equipment (UE) served by the small cell often changes. If UE currently within a small cell does not need to perform service data transmission, the small cell may be temporarily disabled to save energy, and in this case, the small cell stops sending signals. When the UE within the small cell needs to perform service data transmission, the small cell may be enabled, to provide a data transmission service for the UE. When the UE served by the small cell does not need to perform service data transmission, disabling the small cell not only can save energy for the small cell, but also can reduce signal interference from the small cell to another cell and improve a channel environment of a communications system, especially in a scenario in which small cells are densely deployed.

However, when the small cell is disabled, the UE considers by default that the small cell always sends at least cell-specific reference signals (CRS). Therefore, the UE performs measurement and/or synchronization by using a CRS received in each downlink subframe. In this case, a result of the measurement and/or synchronization performed by the UE is obviously erroneous.

SUMMARY

The present invention provides a method and an apparatus for supporting user equipment in task execution, so as to resolve a problem that a result of measurement and/or synchronization performed by user equipment is erroneous, and improve accuracy of measurement and/or synchronization performed by the user equipment.

According to a first aspect, a method for supporting user equipment in task execution is provided, where the method includes:

acquiring, by a first network-side device, duration of a cell working state, where the duration of the cell working state includes duration for which a cell performs signal sending and/or duration for which the cell does not perform signal sending; and determining, by the first network-side device, a time for user equipment to perform measurement and/or synchronization, where the time for the user equipment to perform measurement is within a range of duration for which a to-be-measured cell performs signal sending, and the time for the user equipment to perform synchronization is within a range of duration for which a serving cell performs signal sending.

With reference to the first aspect, in a first possible implementation manner, the acquiring, by a first network-side device, duration of a cell working state includes:

configuring, by the first network-side device, duration of a cell working state of a cell; or acquiring, by the first network-side device, duration, configured by an Operation, Administration and Maintenance OAM entity, of a cell working state.

With reference to the first possible implementation manner of the first aspect, in a second possible implementation manner, the configuring, by the first network-side device, duration of a cell working state includes:

configuring, by the first network-side device, duration of a cell working state of the serving cell according to service information of the serving cell of the user equipment; or configuring, by the first network-side device, duration of a cell working state of the serving cell according to received duration of a cell working state of a neighboring cell.

With reference to the second possible implementation manner of the first aspect, in a third possible implementation manner, after the configuring, by the first network-side device, duration of a cell working state of the serving cell, the method further includes:

notifying, by the first network-side device, the duration of the cell working state of the serving cell to the neighboring cell.

With reference to the first aspect or any possible implementation manner of the first to third possible implementation manners of the first aspect, in a fourth possible implementation manner, the duration of the cell working state includes the duration of the working state of the serving cell and the duration of the working state of the neighboring cell;

working states of the serving cell and an intra-frequency neighboring cell in a first set time period are the same; and working states of the serving cell and an inter-frequency neighboring cell in a second set time period are different, where the first set time period is a part or all of a time period during which the serving cell performs signal sending, and the second set time period is a part or all of the time period during which the serving cell performs signal sending and a part or all of a time period during which the serving cell does not perform signal sending.

With reference to the first aspect or any possible implementation manner of the first to fourth possible implementation manners of the first aspect, in a fifth possible implementation manner, after the determining, by the first network-side device, a time for user equipment to perform measurement and/or synchronization, the method further includes:

sending, by the first network-side device to the user equipment, indication information that indicates the time for the user equipment to perform measurement and/or synchronization.

With reference to the fifth possible implementation manner of the first aspect, in a sixth possible implementation manner, the indication information includes information indicating the duration of the cell working state; and/or the indication information includes subframe scheduling information that indicates the time for the user equipment to perform measurement and/or synchronization.

With reference to the sixth possible implementation manner of the first aspect, in a seventh possible implementation manner, the indication information includes the subframe scheduling information that indicates the time for the user equipment to perform measurement and/or synchronization; and the subframe scheduling information includes a discontinuous reception cycle DRX cycle, where the DRX cycle includes an active-state time of the user equipment and an inactive-state time of the user equipment, and the active-state time of the user equipment is within the range of the duration for which the serving cell of the user equipment performs signal sending.

With reference to the sixth possible implementation manner of the first aspect, in an eighth possible implementation manner, the indication information includes the subframe scheduling information that indicates the time for the user equipment to perform measurement; and the subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell performs signal sending.

According to a second aspect, a method for supporting user equipment in task execution is provided, where the method includes:

receiving, by user equipment, indication information that is sent by a first network-side device according to duration of a cell working state and that indicates a time for the user equipment to perform measurement and/or synchronization, where the duration of the cell working state includes duration for which a cell performs signal sending and/or duration for which the cell does not perform signal sending; and determining, by the user equipment according to the indication information, the time to perform measurement and/or synchronization, and performing measurement and/or synchronization within the time to perform measurement and/or synchronization, where the time to perform measurement is within a range of duration for which a to-be-measured cell performs signal sending, and the time to perform synchronization is within a range of duration for which a serving cell performs signal sending.

With reference to the second aspect, in a first possible implementation manner, the indication information includes information indicating the duration of the cell working state; and/or the indication information includes subframe scheduling information that indicates the time for the user equipment to perform measurement and/or synchronization.

According to a third aspect, an apparatus for supporting user equipment in task execution is provided, where the apparatus includes:

an acquiring module, configured to acquire duration of a cell working state, and transmit the acquired duration to a determining module, where the duration of the cell working state includes duration for which a cell performs signal sending and/or duration for which the cell does not perform signal sending; and the determining module, configured to receive the duration acquired by the acquiring module, and determine a time for user equipment to perform measurement and/or synchronization, where the time for the user equipment to perform measurement is within a range of duration for which a to-be-measured cell performs signal sending, and the time for the user equipment to perform synchronization is within a range of duration for which a serving cell performs signal sending.

With reference to the third aspect, in a first possible implementation manner, the acquiring module is specifically configured to:

configure duration of a cell working state of a cell; or acquire duration, configured by an Operation, Administration and Maintenance OAM entity, of a cell working state.

With reference to the first possible implementation manner of the third aspect, in a second possible implementation manner, the acquiring module is specifically configured to configure duration of a cell working state of a cell according to the following step:

configuring duration of a cell working state of the serving cell according to service information of the serving cell of the user equipment; or configuring duration of a cell working state of the serving cell according to received duration of a cell working state of a neighboring cell.

With reference to the second possible implementation manner of the third aspect, in a third possible implementation manner, the acquiring module is specifically configured to notify the duration of the cell working state of the serving cell to the neighboring cell after configuring the duration of the cell working state of the serving cell.

With reference to the third aspect or any possible implementation manner of the first to third possible implementation manners of the third aspect, in a fourth possible implementation manner, the duration of the cell working state includes the duration of the working state of the serving cell and the duration of the working state of the neighboring cell;

working states of the serving cell and an intra-frequency neighboring cell in a first set time period are the same; and working states of the serving cell and an inter-frequency neighboring cell in a second set time period are different, where the first set time period is a part or all of a time period during which the serving cell performs signal sending, and the second set time period is a part or all of the time period during which the serving cell performs signal sending and a part or all of a time period during which the serving cell does not perform signal sending.

With reference to the third aspect or any possible implementation manner of the first to fourth possible implementation manners of the third aspect, in a fifth possible implementation manner, the apparatus further includes:

a sending module, configured to: after the determining module determines the time for the user equipment to perform measurement and/or synchronization, send, to the user equipment, indication information that indicates the time for the user equipment to perform measurement and/or synchronization.

With reference to the fifth possible implementation manner of the third aspect, in a sixth possible implementation manner, the indication information includes information indicating the duration of the cell working state; and/or the indication information includes subframe scheduling information that indicates the time for the user equipment to perform measurement and/or synchronization.

With reference to the sixth possible implementation manner of the third aspect, in a seventh possible implementation manner, the indication information includes the subframe scheduling information that indicates the time for the user equipment to perform measurement and/or synchronization; and the subframe scheduling information includes a discontinuous reception cycle DRX cycle, where the DRX cycle includes an active-state time of the user equipment and an inactive-state time of the user equipment, and the active-state time of the user equipment is within the range of the duration for which the serving cell of the user equipment performs signal sending.

With reference to the sixth possible implementation manner of the third aspect, in an eighth possible implementation manner, the indication information includes the subframe scheduling information that indicates the time for the user equipment to perform measurement; and the subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell performs signal sending.

According to a fourth aspect, an apparatus for supporting user equipment in task execution is provided, where the apparatus includes:

a receiving module, configured to receive indication information that is sent by a first network-side device according to duration of a cell working state and that indicates time for user equipment to perform measurement and/or synchronization, where the duration of the cell working state includes duration for which a cell performs signal sending and/or duration for which the cell does not perform signal sending; and an execution module, configured to determine, according to the indication information, the time to perform measurement and/or synchronization, and perform measurement and/or synchronization within the time to perform measurement and/or synchronization, where the time to perform measurement is within a range of duration for which a to-be-measured cell performs signal sending, and the time to perform synchronization is within a range of duration for which a serving cell performs signal sending.

With reference to the fourth aspect, in a first possible implementation manner, the indication information includes information indicating the duration of the cell working state; and/or the indication information includes subframe scheduling information that indicates the time for the user equipment to perform measurement and/or synchronization.

According to a fifth aspect, a method for supporting user equipment in task execution is provided, where the method includes:

acquiring, by a first network-side device, duration of a cell working state, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state; and determining, by the first network-side device, a time for user equipment to perform measurement and/or synchronization, where the time for the user equipment to perform measurement is within a range of duration for which a to-be-measured cell is in a semi-static enabled state and/or a range of duration for which the to-be-measured cell performs signal sending in a dynamic enabled-disabled state, and the time for the user equipment to perform synchronization is within a range of duration for which a serving cell is in a semi-static enabled state.

With reference to the fifth aspect, in a first possible implementation manner, the acquiring, by a first network-side device, duration of a cell working state includes:

configuring, by the first network-side device, duration of a cell working state of a cell; or acquiring, by the first network-side device, duration, configured by an Operation, Administration and Maintenance OAM entity, of a cell working state.

With reference to the first possible implementation manner of the fifth aspect, in a second possible implementation manner, the configuring, by the first network-side device, duration of a cell working state includes:

configuring, by the first network-side device, duration of a cell working state of the serving cell according to service information of the serving cell of the user equipment; or configuring, by the first network-side device, duration of a cell working state of the serving cell according to received duration of a cell working state of a neighboring cell.

With reference to the second possible implementation manner of the fifth aspect, in a third possible implementation manner, after the configuring, by the first network-side device, duration of a cell working state of the serving cell, the method further includes:

notifying, by the first network-side device, the duration of the cell working state of the serving cell to the neighboring cell.

With reference to the fifth aspect or any possible implementation manner of the first to third possible implementation manners of the fifth aspect, in a fourth possible implementation manner, the duration of the cell working state includes the duration of the working state of the serving cell and the duration of the working state of the neighboring cell;

working states of the serving cell and an intra-frequency neighboring cell in a first set time period are the same; and working states of the serving cell and an inter-frequency neighboring cell in a second set time period are different, where the first set time period is a part or all of a time period of the semi-static enabled state of the serving cell, and the second set time period is a part or all of the time period of the semi-static enabled state of the serving cell and a part or all of a time period of a dynamic enabled-disabled state of the serving cell.

With reference to the fifth aspect or any possible implementation manner of the first to fourth possible implementation manners of the fifth aspect, in a fifth possible implementation manner, after the determining, by the first network-side device, a time for user equipment to perform measurement and/or synchronization, the method further includes:

sending, by the first network-side device to the user equipment, indication information that indicates the time for the user equipment to perform measurement and/or synchronization.

With reference to the fifth possible implementation manner of the fifth aspect, in a sixth possible implementation manner, the indication information includes information indicating the duration of the cell working state; and/or the indication information includes subframe scheduling information that indicates the time for the user equipment to perform measurement and/or synchronization.

With reference to the sixth possible implementation manner of the fifth aspect, in a seventh possible implementation manner, the indication information includes the subframe scheduling information that indicates the time for the user equipment to perform measurement and/or synchronization; and the subframe scheduling information includes a discontinuous reception cycle DRX cycle, where the DRX cycle includes an active-state time of the user equipment and an inactive-state time of the user equipment, and the active-state time of the user equipment is within the range of the duration for which the serving cell of the user equipment is in the semi-static enabled state.

With reference to the sixth possible implementation manner of the fifth aspect, in an eighth possible implementation manner, the indication information includes subframe scheduling information that indicates the time for the user equipment to perform measurement; and the subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell is in the semi-static enabled state and/or the range of the duration for which the to-be-measured cell performs signal sending in the dynamic enabled-disabled state.

According to a sixth aspect, a method for supporting user equipment in task execution is provided, where the method includes:

receiving, by user equipment, indication information that is sent by a first network-side device according to duration of a cell working state and that indicates a time for the user equipment to perform measurement and/or synchronization, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state; and determining, by the user equipment according to the indication information, the time to perform measurement and/or synchronization, and performing measurement and/or synchronization within the time to perform measurement and/or synchronization, where the time to perform measurement is within a range of duration for which a to-be-measured cell is in a semi-static enabled state and/or a range of duration for which the to-be-measured cell performs signal sending in a dynamic enabled-disabled state, and the time to perform synchronization is within a range of duration for which a serving cell is in a semi-static enabled state.

With reference to the sixth aspect, in a first possible implementation manner, the indication information includes information indicating the duration of the cell working state; and/or the indication information includes subframe scheduling information that indicates the time for the user equipment to perform measurement and/or synchronization.

According to a seventh aspect, an apparatus for supporting user equipment in task execution is provided, where the apparatus includes:

an acquiring module, configured to acquire duration of a cell working state, and transmit the acquired duration to a determining module, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state; and the determining module, configured to receive the duration acquired by the acquiring module, and determine a time for user equipment to perform measurement and/or synchronization, where the time for the user equipment to perform measurement is within a range of duration for which a to-be-measured cell is in a semi-static enabled state and/or a range of duration for which the to-be-measured cell performs signal sending in a dynamic enabled-disabled state, and the time for the user equipment to perform synchronization is within a range of duration for which a serving cell is in a semi-static enabled state.

With reference to the seventh aspect, in a first possible implementation manner, the acquiring module is specifically configured to:

configure duration of a cell working state of a cell; or acquire duration, configured by an Operation, Administration and Maintenance OAM entity, of a cell working state.

With reference to the first possible implementation manner of the seventh aspect, in a second possible implementation manner, the acquiring module is specifically configured to configure duration of a cell working state according to the following step:

configuring duration of a cell working state of the serving cell according to service information of the serving cell of the user equipment; or configuring duration of a cell working state of the serving cell according to received duration of a cell working state of a neighboring cell.

With reference to the second possible implementation manner of the seventh aspect, in a third possible implementation manner, the acquiring module is specifically configured to notify the duration of the cell working state of the serving cell to the neighboring cell after configuring the duration of the cell working state of the serving cell.

With reference to the seventh aspect or any possible implementation manner of the first to third possible implementation manners of the seventh aspect, in a fourth possible implementation manner, the duration of the cell working state includes the duration of the working state of the serving cell and the duration of the working state of the neighboring cell;

working states of the serving cell and an intra-frequency neighboring cell in a first set time period are the same; and working states of the serving cell and an inter-frequency neighboring cell in a second set time period are different, where the first set time period is a part or all of a time period of the semi-static enabled state of the serving cell, and the second set time period is a part or all of the time period of the semi-static enabled state of the serving cell and a part or all of a time period of a dynamic enabled-disabled state of the serving cell.

With reference to the seventh aspect or any possible implementation manner of the first to fourth possible implementation manners of the seventh aspect, in a fifth possible implementation manner, the apparatus further includes:

a sending module, configured to: after the determining module determines the time for the user equipment to perform measurement and/or synchronization, send, to the user equipment, indication information that indicates the time for the user equipment to perform measurement and/or synchronization.

With reference to the fifth possible implementation manner of the seventh aspect, in a sixth possible implementation manner, the indication information includes information indicating the duration of the cell working state; and/or the indication information includes subframe scheduling information that indicates the time for the user equipment to perform measurement and/or synchronization.

With reference to the sixth possible implementation manner of the seventh aspect, in a seventh possible implementation manner, the indication information includes the subframe scheduling information that indicates the time for the user equipment to perform measurement and/or synchronization; and the subframe scheduling information includes a discontinuous reception cycle DRX cycle, where the DRX cycle includes an active-state time of the user equipment and an inactive-state time of the user equipment, and the active-state time of the user equipment is within the range of the duration for which the serving cell of the user equipment is in the semi-static enabled state.

With reference to the seventh possible implementation manner of the seventh aspect, in an eighth possible implementation manner, the indication information includes subframe scheduling information that indicates the time for the user equipment to perform measurement; and the subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell is in the semi-static enabled state and/or the range of the duration for which the to-be-measured cell performs signal sending in the dynamic enabled-disabled state.

According to an eighth aspect, an apparatus for supporting user equipment in task execution is provided, where the apparatus includes:

a receiving module, configured to receive indication information that is sent by a first network-side device according to duration of a cell working state and that indicates a time for the user equipment to perform measurement and/or synchronization, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state; and an execution module, configured to determine, according to the indication information, the time to perform measurement and/or synchronization, and perform measurement and/or synchronization within the time to perform measurement and/or synchronization, where the time to perform measurement is within a range of duration for which a to-be-measured cell is in a semi-static enabled state and/or a range of duration for which the to-be-measured cell performs signal sending in a dynamic enabled-disabled state, and the time to perform synchronization is within a range of duration for which a serving cell is in a semi-static enabled state.

With reference to the eighth aspect, in a first possible implementation manner, the indication information includes information indicating the duration of the cell working state; and/or the indication information includes subframe scheduling information that indicates the time for the user equipment to perform measurement and/or synchronization.

DETAILED DESCRIPTION

Figure 1:
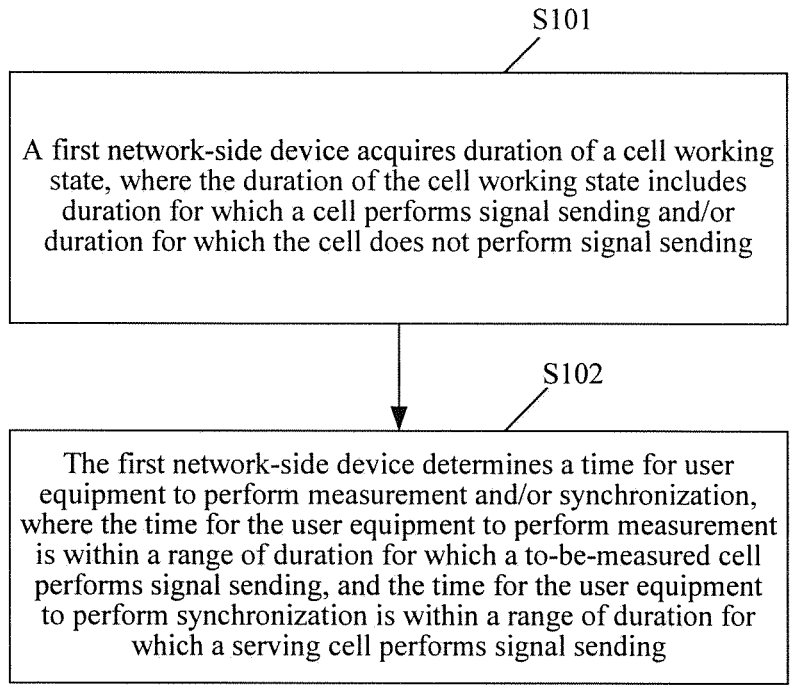
FIG. 1 is a flowchart of a method for supporting user equipment in task execution according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, Wideband Code Division Multiple Access (WCDMA), a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

This specification describes various aspects with reference to user equipment and/or a base station.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

The base station (for example, an access point) may refer to a device in communication with a wireless terminal by using one or more sectors at an air interface in an access network. The base station may be configured to mutually convert a received over-the-air frame and an IP packet and serve as a router between the wireless terminal and a rest part of the access network, where the rest part of the access network may include an Internet protocol (IP) network. The base station may also coordinate attribute management of the air interface. For example, the base station may be a base transceiver station (BTS) in GSM or CDMA, may also be a NodeB in WCDMA, and may further be an evolved NodeB (NodeB, eNB, or e-NodeB) in LTE, which is not limited in this application.

In addition, the term "and/or" in this specification describes only an association relationship for describing associated objects and represents that three relationships may exist. For example, A and/or B may represent the following three cases: Only A exists; both A and B exist; only B exists. In addition, the character "/" in this specification generally indicates an "or" relationship between the associated objects.

It should be noted that a cell in the embodiments of the present invention may be equivalent to a base station.

As shown in FIG. 1, FIG. 1 is a flowchart of a method for supporting user equipment in task execution according to Embodiment 1 of the present invention, and the method includes the following steps:

S101: A first network-side device acquires duration of a cell working state, where the duration of the cell working state includes duration for which a cell performs signal sending and/or duration for which the cell does not perform signal sending.

S102: The first network-side device determines a time for user equipment to perform measurement and/or synchronization, where the time for the user equipment to perform measurement is within a range of duration for which a to-be-measured cell performs signal sending, and the time for the user equipment to perform synchronization is within a range of duration for which a serving cell performs signal sending.

In a specific implementation process, the first network-side device may be a serving cell on which the UE camps, and the cell working state may include a working state of the serving cell and/or a working state of a neighboring cell. After determining the duration of the cell working state, the first network-side device may determine, according to the duration of the cell working state, the time for the UE in the serving cell to perform measurement and/or synchronization. The measurement herein may include any one or more of radio resource measurement (RRM), radio link monitoring (RLM) measurement, and channel state information (CSI) measurement. The measurement performed by the UE includes measurement of the serving cell and/or measurement of the neighboring cell. The synchronization herein may include initial synchronization, synchronization tracking, and/or the like. The synchronization performed by the UE includes synchronization with the serving cell.

It should be noted that the first network-side device may acquire only the duration for which the cell performs signal sending, and determine, according to the duration for which the cell performs signal sending, the time for the UE to perform measurement and/or synchronization; or may acquire only the duration for which the cell does not perform signal sending, and determine, according to the duration for which the cell does not perform signal sending, the time for the UE to perform measurement and/or synchronization; or may acquire both the duration for which the cell performs signal sending and the duration for which the cell does not perform signal sending.

According to the foregoing method, a first network-side device may determine, according to duration of a cell working state, a time for UE in a serving cell to perform measurement and/or synchronization, and further, may instruct, according to the determined time, the UE to perform measurement and/or synchronization. Because the time to perform measurement is within a range of duration for which a to-be-measured cell performs signal sending, and the time to perform synchronization is within a range of duration for which the serving cell performs signal sending, accuracy of a result of measurement and/or synchronization performed by the UE can be ensured. According to this method, not only can accuracy of a result of measurement and/or synchronization performed by UE be ensured, but also disabling of a cell when the cell has no service can be implemented; therefore, energy can be saved for the cell, signal interference from the cell to another cell can be reduced, and system performance can be performed.

Optionally, in step S101, the acquiring, by a first network-side device, duration of a cell working state includes:

configuring, by the first network-side device, duration of a cell working state of a cell; or acquiring, by the first network-side device, duration, configured by an Operation, Administration and Maintenance (OAM) entity, of the cell working state.

In a specific implementation process, if the UE only needs to perform measurement on the serving cell and/or perform synchronization with the serving cell, the first network-side device may directly configure duration of a cell working state of the serving cell, or acquire duration, configured by the OAM entity, of a cell working state of the serving cell; if the UE also needs to perform measurement on the neighboring cell, the first network-side device also needs to acquire duration of a cell working state of the neighboring cell. The first network-side device may determine the duration of the cell working state of the serving cell and the duration of the cell working state of the neighboring cell by performing signaling interaction with the neighboring cell. Specifically, the first network-side device and the neighboring cell may exchange working state information with each other by using a wireless or wired interface, for example, by using an X2 interface, an S1 interface, or an air interface. The first network-side device may also directly acquire the duration of the cell working state of the serving cell and the duration of the cell working state of the neighboring cell that are configured by the OAM entity.

Optionally, the configuring, by the first network-side device, duration of a cell working state includes:

configuring, by the first network-side device, duration of a cell working state of the serving cell according to service information of the serving cell of the user equipment; or configuring, by the first network-side device, duration of a cell working state of the serving cell according to received duration of a cell working state of a neighboring cell.

Optionally, after the configuring, by the first network-side device, duration of a cell working state of the serving cell, the method further includes:

notifying, by the first network-side device, the duration of the cell working state of the serving cell to the neighboring cell.

As an implementable manner, the first network-side device may first configure the duration of the cell working state of the serving cell according to service information that indicates service busyness of the serving cell, and then may send the configured duration of the cell working state of the serving cell to the neighboring cell; the neighboring cell may configure duration of a cell working state of the neighboring cell according to the received duration of the cell working state of the serving cell, and send the configured duration of the cell working state of the neighboring cell to the first network-side device. Optionally, after receiving the duration of the cell working state of the neighboring cell, the first network-side device may further send information to the neighboring cell, to acknowledge reception of the duration of the cell working state of the neighboring cell. After a set time period, the first network-side device may determine, according to the duration of the cell working state that is determined after interaction with the neighboring cell, configuration information that indicates the duration of the working state of the serving cell and the duration of the working state of the neighboring cell. The set time period herein is known to both the first network-side device and the neighboring cell. The first network-side device and the neighboring cell may determine the set time period by performing information exchange, or may directly acquire a set time period configured by the OAM entity.

As another implementable manner, the first network-side device may first configure the duration of the cell working state of the serving cell according to service information that indicates service busyness of the serving cell, and then may send the configured duration of the cell working state of the serving cell to the neighboring cell; if the neighboring cell cannot perform adaptive configuration on duration of a cell working state of the neighboring cell according to the received duration of the cell working state of the serving cell and service information of the neighboring cell, the neighboring cell may send duration, configured according to the service information of the neighboring cell, of the cell working state to the first network-side device; the first network-side device adaptively adjusts the initially configured duration of the cell working state of the serving cell. Optionally, after receiving the duration of the cell working state of the neighboring cell that is configured by the neighboring cell, the first network-side device adaptively adjusts the initially configured duration of the cell working state of the serving cell, and sends information to the neighboring cell, to acknowledge reception of the duration of the cell working state of the neighboring cell, and/or notifies the neighboring cell of adjusted duration of the cell working state of the serving cell. After a set time period, the first network-side device may determine, according to the duration of the cell working state that is determined after interaction with the neighboring cell, configuration information that indicates the duration of the working state of the serving cell and the duration of the working state of the neighboring cell. The set time period herein is known to both the first network-side device and the neighboring cell. The first network-side device and the neighboring cell may determine the set time period by performing information exchange, or may directly acquire a set time period configured by the OAM entity.

Correspondingly, as an implementable manner, after receiving duration of a cell working state of the neighboring cell, the first network-side device may configure the duration of the cell working state of the serving cell according to the duration of the cell working state of the neighboring cell, and send the configured duration of the cell working state of the serving cell to the neighboring cell. Optionally, after receiving the duration of the cell working state of the serving cell that is sent by the first network-side device, the neighboring cell may send information to the first network-side device, to acknowledge reception of the duration of the cell working state of the serving cell. After a set time period, the first network-side device may determine, according to the duration of the cell working state that is determined after interaction with the neighboring cell, configuration information that indicates the duration of the working state of the serving cell and the duration of the working state of the neighboring cell. The set time period herein is known to both the first network-side device and the neighboring cell. The first network-side device and the neighboring cell may determine the set time period by performing information exchange, or may directly acquire a set time period configured by the OAM entity.

As another implementable manner, the neighboring cell may first configure duration of a cell working state of the neighboring cell according to service information that indicates service busyness of the neighboring cell, and then may send the configured duration of the cell working state of the neighboring cell to the first network-side device; if the first network-side device cannot perform adaptive configuration on duration of a cell working state of the serving cell according to the received duration of the cell working state of the neighboring cell and service information of the serving cell, the first network-side device may further send duration, configured according to the service information of the serving cell, of the cell working state of the serving cell to another network-side device of the neighboring cell; and the neighboring cell adaptively adjusts the initially configured duration of the cell working state of the neighboring cell. Optionally, after receiving the duration of the cell working state of the serving cell, the neighboring cell adaptively adjusts the initially configured duration of the cell working state of the neighboring cell, and sends information to the first network-side device, to acknowledge reception of the duration of the cell working state of the serving cell, and/or notifies the first network-side device of adjusted duration of the cell working state of the neighboring cell. After a set time period, the first network-side device may determine, according to the duration of the cell working state that is determined after interaction with the neighboring cell, configuration information that indicates the duration of the working state of the serving cell and the duration of the working state of the neighboring cell. The set time period herein is known to both the first network-side device and the neighboring cell. The first network-side device and the neighboring cell may determine the set time period by performing information exchange, or may directly acquire a set time period configured by the OAM entity.

In this embodiment of the present invention, when the UE needs to perform measurement on the neighboring cell, the duration of the cell working state acquired by the first network-side device includes the duration of the working state of the serving cell and the duration of the working state of the neighboring cell, where the working states of the serving cell and the neighboring cell need to satisfy the following relationships:

working states of the serving cell and an intra-frequency neighboring cell in a first set time period are the same; and working states of the serving cell and an inter-frequency neighboring cell in a second set time period are different.

The first set time period is a part or all of a time period during which the serving cell performs signal sending. In this way, when the serving cell is in an enabled state, the UE can perform measurement on the intra-frequency neighboring cell that is also in an enabled state. Likewise, when the intra-frequency neighboring cell is in an enabled state, UE in the intra-frequency neighboring cell can perform measurement on the serving cell that is also in an enabled state. The second set time period is a part or all of the time period during which the serving cell performs signal sending and a part or all of a time period during which the serving cell does not perform signal sending. In this way, when the serving cell is in a disabled state, the UE can perform measurement on the inter-frequency neighboring cell that is in an enabled state. Likewise, when the inter-frequency neighboring cell is in a disabled state, UE in the inter-frequency neighboring cell can perform measurement on the serving cell that is in an enabled state.

In this embodiment of the present invention, after determining the time for the user equipment to perform measurement and/or synchronization, the first network-side device may instruct, according to the determined time, the user equipment to perform measurement and/or synchronization, that is, after the determining, by the first network-side device, a time for user equipment to perform measurement and/or synchronization, the method further includes:

sending, by the first network-side device to the user equipment, indication information that indicates the time for the user equipment to perform measurement and/or synchronization.

In a specific implementation process, there may be multiple manners in which the first network-side device indicates the time to perform measurement and/or synchronization to the user equipment: the first network-side device may explicitly or implicitly indicate the time for the user equipment to perform measurement and/or synchronization. The first network-side device may directly send the duration of the cell working state to the UE, or may send, to the UE, information about the time for the UE to perform measurement and/or synchronization, where the duration of the cell working state includes duration for which a cell performs signal sending, that is, duration for which the cell is in an enabled state, and/or duration for which the cell does not perform signal sending, that is, duration for which the cell is in a disabled state. The first network-side device may add, to a new message, information that indicates the time for the user equipment to perform measurement and/or synchronization, to indicate the time to the UE; or may configure an existing message, to indicate the time to the UE. In an embodiment, the first network-side device sends, to the UE by using a message, a time segment randomly selected from a range of the duration for which the cell performs signal sending, and the UE may perform measurement and/or synchronization within the received time segment. In another embodiment, the first network-side device sends, to the UE by using a message, the duration for which the cell does not perform signal sending, and the UE may perform, according to an agreement made in advance with a network side, measurement and/or synchronization within time excluding the received duration for which the cell does not perform signal sending. In another embodiment, the first network-side device may send, to the UE by using a message, the time for the UE to perform measurement and/or synchronization, where the time to perform measurement and/or synchronization is a time segment randomly selected by the first network-side device from a range of the duration for which the cell performs signal sending. In these embodiments, if the user equipment needs to perform measurement, the foregoing cell refers to the to-be-measured cell; if the user equipment needs to perform synchronization, the foregoing cell refers to the serving cell.

Optionally, the indication information includes information indicating the duration of the cell working state; and/or the indication information includes subframe scheduling information that indicates the time for the user equipment to perform measurement and/or synchronization.

In a specific implementation process, there may be specifically two manners in which the first network-side device indicates the time for the user equipment to perform measurement and/or synchronization. One manner is directly sending, to the UE, information indicating the duration of the cell working state, so that the UE determines, according to an agreement made in advance with the network side, the time to perform measurement and/or synchronization. This manner applies to UE in an evolved version. The other manner is determining, according to the determined time for the UE to perform measurement and/or synchronization, subframe scheduling information used for the UE to perform measurement and/or synchronization, and sending the subframe scheduling information to the UE. This manner applies to UE in an evolved version or a non-evolved version. The manners are separately described below.

The first manner: Send, to the UE, information indicating the duration of the cell working state.

In a specific implementation process, for UE in an evolved version such as 3GPP Release 12 (R12), after the duration of the cell working state is determined, information indicating the duration of the cell working state may be sent to the UE, so that the UE in the evolved version such as R12 can perform measurement and/or synchronization according to the duration of the cell working state. Specifically, when the UE needs to perform measurement, the first network-side device may send, to the UE, only the duration for which the to-be-measured cell performs signal sending, or may send, to the UE, only duration for which the to-be-measured cell does not perform signal sending, or may send, to the UE, both the duration for which the to-be-measured cell performs signal sending and duration for which the to-be-measured cell does not perform signal sending. When the UE needs to perform synchronization, the first network-side device may send, to the UE, only the duration for which the serving cell performs signal sending, or may send, to the UE, only duration for which the serving cell does not perform signal sending, or may send, to the UE, both the duration for which the serving cell performs signal sending and duration for which the serving cell does not perform signal sending. A process in which the UE performs measurement and/or synchronization according to the duration of the cell working state is:

the UE performs measurement within the duration for which the to-be-measured cell performs signal sending and/or performs synchronization within the duration for which the serving cell performs signal sending.

Specifically, the UE may perform measurement on the serving cell and/or perform synchronization with the serving cell within the duration for which the serving cell performs signal sending. The UE may also perform measurement, within the duration for which the serving cell performs signal sending, on an intra-frequency neighboring cell that also performs signal sending for the duration, or may perform measurement, within the duration for which the serving cell does not perform signal sending, on an inter-frequency neighboring cell that is performing signal sending for the duration, or may perform measurement, within the duration for which the serving cell performs signal sending and according to an inter-frequency measurement interval configured by a base station, on the inter-frequency neighboring cell that performs signal sending for the duration. Optionally, the UE may directly perform measurement on the neighboring cell according to information that is sent by the first network-side device and that indicates the duration for which the neighboring cell is in a signal sending state, without considering the working state of the serving cell, and in this case, the network-side device already predetermines the working states of the serving cell and the neighboring cell, so that the working states of the two may satisfy the foregoing conditions on which the UE performs measurement.

In the foregoing manner, the UE may determine the duration of the working state of the serving cell and/or the duration of the working state of the neighboring cell according to information that is sent by the first network-side device and that indicates the duration of the working state of the serving cell and/or the duration of the working state of the neighboring cell. There may be multiple manners in which the UE determines the duration of the cell working state of the serving cell and/or the duration of the cell working state of the neighboring cell: the UE may determine the duration of the cell working state of the neighboring cell according to a preset correspondence between the cell working state of the serving cell and the cell working state of the neighboring cell after receiving the duration of the cell working state of the serving cell sent by the first network-side device; and the UE may further determine the duration of the cell working state of the serving cell according to the correspondence between the cell working state of the serving cell and the cell working state of the neighboring cell after receiving the duration of the cell working state of the neighboring cell sent by the first network-side device. Herein, a correspondence between the cell working state of the serving cell and a cell working state of an intra-frequency neighboring cell may be that the working states of the serving cell and the intra-frequency neighboring cell in the first set time period are the same, and a correspondence between the cell working state of the serving cell and a cell working state of an inter-frequency neighboring cell may be that the working states of the serving cell and the inter-frequency neighboring cell in the second set time period are different. A relationship between the working state of the serving cell and the working state of the neighboring cell is described in detail in the following content in this embodiment of the present invention, and details are not described herein again. Besides, the UE may further receive the duration of the cell working state of the serving cell and the duration of the cell working state of the neighboring cell that are sent by the first network-side device.

The second manner: Send, to the UE, subframe scheduling information used for the UE to perform measurement and/or synchronization.

In a specific implementation process, for UE in a low version such as R8, R9, R10, or R11, subframe scheduling information determined according to duration of different cell working states of a cell may be sent to the UE. For UE in R8 and R9, the subframe scheduling information may include a discontinuous reception cycle (Discontinuous Reception Cycle, DRX cycle), and for UE in R10 and R11, the subframe scheduling information may include a restrictive measurement set (Resource-Restricted Measurement Set) in addition to the DRX cycle. The two subframe scheduling manners are separately described blow.

Manner 1: The subframe scheduling information includes a discontinuous reception cycle DRX cycle, which is used to indicate the time for the UE to perform measurement and/or synchronization, where the DRX cycle includes an active-state time of the UE and an inactive-state time of the UE, and the active-state time of the UE is within the range of the duration for which the serving cell of the UE performs signal sending.

In a specific implementation process, for the UE in R8 and R9, a DRX cycle may be configured. The UE may perform measurement on the serving cell and/or perform synchronization with the serving cell in the active-state time of the UE within the DRX cycle, and may also perform measurement on the intra-frequency neighboring cell in the active-state time of the UE within the DRX cycle. Therefore, the DRX cycle may be configured, so that the active-state time of the UE is within the duration for which the serving cell performs signal sending, and the inactive-state time of the UE is within the duration for which the serving cell does not perform signal sending or the inactive-state time of the UE may be also within the duration for which the serving cell performs signal sending.

For the UE in R10 and R11 versions, in addition to performing measurement and/or synchronization by using the DRX cycle, measurement may also be performed by configuring a restrictive measurement subframe set, which is as follows:

Manner 2: The subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell performs signal sending.

During specific implementation, the first network-side device may configure a restrictive measurement subframe set, so that all subframes in the restrictive measurement subframe set are within the range of the duration for which the to-be-measured cell performs signal sending.

Figure 2:
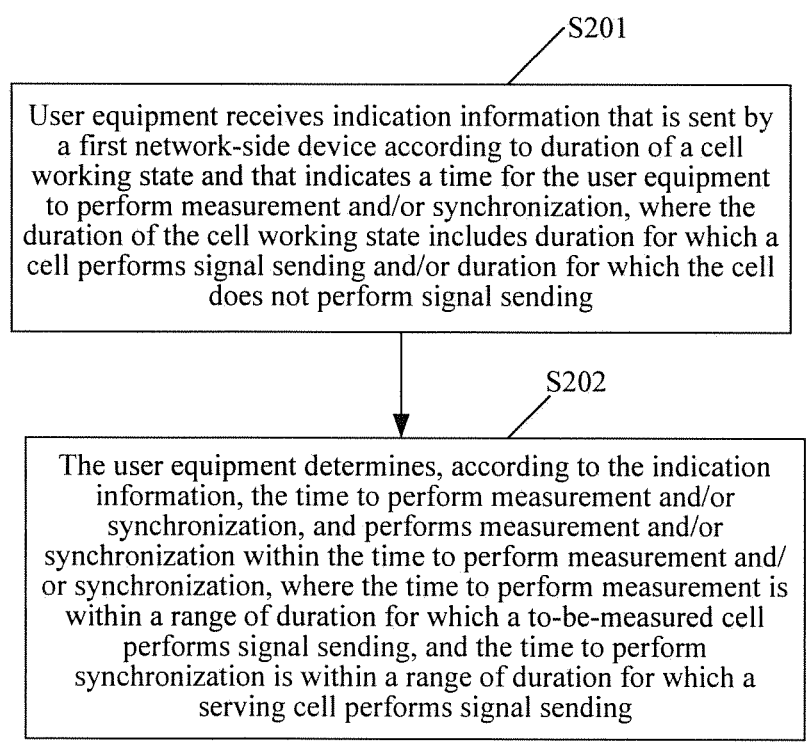
FIG. 2 is a flowchart of a method for supporting user equipment in task execution according to Embodiment 2 of the present invention.

As shown in FIG. 2, FIG. 2 is a flowchart of a method for supporting user equipment in task execution according to Embodiment 2 of the present invention, and the method includes:

S201: User equipment receives indication information that is sent by a first network-side device according to duration of a cell working state and that indicates a time for the user equipment to perform measurement and/or synchronization, where the duration of the cell working state includes duration for which a cell performs signal sending and/or duration for which the cell does not perform signal sending.

S202: The user equipment determines, according to the indication information, the time to perform measurement and/or synchronization, and performs measurement and/or synchronization within the time to perform measurement and/or synchronization, where the time to perform measurement is within a range of duration for which a to-be-measured cell performs signal sending, and the time to perform synchronization is within a range of duration for which a serving cell performs signal sending.

Optionally, the indication information includes information indicating the duration of the cell working state; and/or the indication information includes subframe scheduling information that indicates the time for the user equipment to perform measurement and/or synchronization.

During specific implementation, for a process in which the UE performs measurement and/or synchronization, reference may be made to the content described in Embodiment 1, and details are not described herein again.

Based on the same invention idea, an embodiment of the present invention further provides an apparatus for supporting UE in task execution, which corresponds to the foregoing method for supporting UE in task execution. Because the principle of problem solving by the apparatus in this embodiment of the present invention is similar to that of the method for supporting UE in task execution in the embodiment of the present invention, for implementation of the apparatus in this embodiment of the present invention, reference may be made to the implementation of the method, and repeated parts are not described again.

Figure 3:
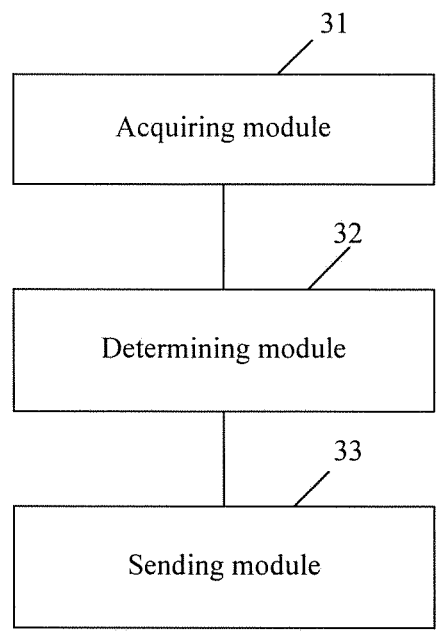
FIG. 3 is a schematic diagram of an apparatus for supporting user equipment in task execution according to Embodiment 1 of the present invention.

As shown in FIG. 3, FIG. 3 is a schematic diagram of an apparatus for supporting user equipment in task execution according to Embodiment 1 of the present invention, and the apparatus includes:

an acquiring module 31, configured to acquire duration of a cell working state, and transmit the acquired duration to a determining module 32, where the duration of the cell working state includes duration for which a cell performs signal sending and/or duration for which the cell does not perform signal sending; and the determining module 32, configured to receive the duration acquired by the acquiring module 31, and determine a time for user equipment to perform measurement and/or synchronization, where the time for the user equipment to perform measurement is within a range of duration for which a to-be-measured cell performs signal sending, and the time for the user equipment to perform synchronization is within a range of duration for which a serving cell performs signal sending.

Optionally, the acquiring module 31 is specifically configured to:

configure duration of a cell working state of a cell; or acquire duration, configured by an Operation, Administration and Maintenance OAM entity, of a cell working state.

Optionally, the acquiring module 31 is specifically configured to configure duration of a cell working state of a cell according to the following step:

configuring duration of a cell working state of the serving cell according to service information of the serving cell of the user equipment; or configuring duration of a cell working state of the serving cell according to received duration of a cell working state of a neighboring cell.

Optionally, the acquiring module 31 is specifically configured to notify the duration of the cell working state of the serving cell to the neighboring cell after configuring the duration of the cell working state of the serving cell.

Optionally, the duration of the cell working state includes the duration of the working state of the serving cell and the duration of the working state of the neighboring cell;

working states of the serving cell and an intra-frequency neighboring cell in a first set time period are the same; and working states of the serving cell and an inter-frequency neighboring cell in a second set time period are different, where the first set time period is a part or all of a time period during which the serving cell performs signal sending, and the second set time period is a part or all of the time period during which the serving cell performs signal sending and a part or all of a time period during which the serving cell does not perform signal sending.

Optionally, the apparatus further includes:

a sending module 33, configured to: after the determining module 32 determines the time for the user equipment to perform measurement and/or synchronization, send, to the user equipment, indication information that indicates the time for the user equipment to perform measurement and/or synchronization.

Optionally, the indication information includes information indicating the duration of the cell working state; and/or the indication information includes subframe scheduling information that indicates the time for the user equipment to perform measurement and/or synchronization.

Optionally, the indication information includes the subframe scheduling information that indicates the time for the user equipment to perform measurement and/or synchronization; and the subframe scheduling information includes a discontinuous reception cycle DRX cycle, where the DRX cycle includes an active-state time of the user equipment and an inactive-state time of the user equipment, and the active-state time of the user equipment is within the range of the duration for which the serving cell of the user equipment performs signal sending.

Optionally, the indication information includes the subframe scheduling information that indicates the time for the user equipment to perform measurement; and the subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell performs signal sending.

Figure 4:
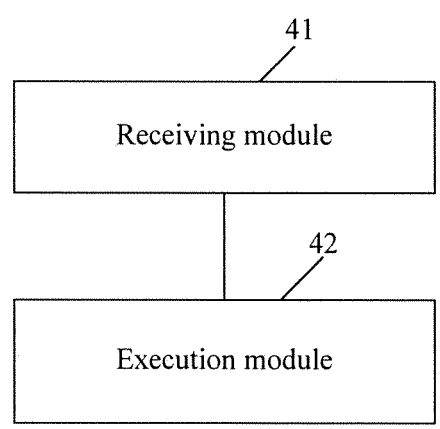
FIG. 4 is a schematic diagram of an apparatus for supporting user equipment in task execution according to Embodiment 2 of the present invention.

As shown in FIG. 4, FIG. 4 is a schematic diagram of an apparatus for supporting user equipment in task execution according to Embodiment 2 of the present invention, and the apparatus includes:

a receiving module 41, configured to receive indication information that is sent by a first network-side device according to duration of a cell working state and that indicates time for user equipment to perform measurement and/or synchronization, and transmit the received indication information to an execution module 42, where the duration of the cell working state includes duration for which a cell performs signal sending and/or duration for which the cell does not perform signal sending; and the execution module 42, configured to determine, according to the indication information received by the receiving module 41, the time to perform measurement and/or synchronization, and perform measurement and/or synchronization within the time to perform measurement and/or synchronization, where the time to perform measurement is within a range of duration for which a to-be-measured cell performs signal sending, and the time to perform synchronization is within a range of duration for which a serving cell performs signal sending.

Optionally, the indication information includes information indicating the duration of the cell working state; and/or the indication information includes subframe scheduling information that indicates the time for the user equipment to perform measurement and/or synchronization.

The following describes an entity apparatus, which corresponds to the foregoing method and apparatus for supporting user equipment in task execution, in an embodiment of the present invention.

Figure 5:
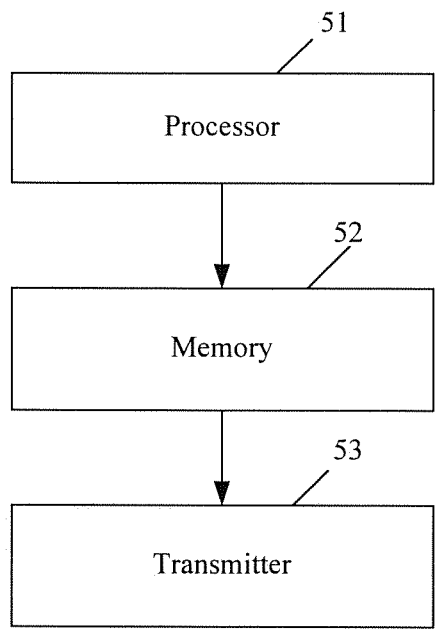
FIG. 5 is a schematic structural diagram of a network-side device according to Embodiment 1 of the present invention.

As shown in FIG. 5, FIG. 5 is a schematic structural diagram of a network-side device according to Embodiment 1 of the present invention, and the network-side device includes:

a processor 51, configured to acquire duration of a cell working state, determine a time for user equipment to perform measurement and/or synchronization, and transmit the determined time to a memory 52, where the duration of the cell working state includes duration for which a cell performs signal sending and/or duration for which the cell does not perform signal sending, the time for the user equipment to perform measurement is within a range of duration for which a to-be-measured cell performs signal sending, and the time for the user equipment to perform synchronization is within a range of duration for which a serving cell performs signal sending; and the memory 52, configured to store the time, determined by the processor 51, for the user equipment to perform measurement and/or synchronization.

Optionally, the processor 51 is specifically configured to: configure duration of a cell working state of a cell; or acquire duration, configured by an Operation, Administration and Maintenance OAM entity, of a cell working state.

Optionally, the processor 51 is specifically configured to configure duration of a cell working state of a cell according to the following step:

configuring duration of a cell working state of the serving cell according to service information of the serving cell of the user equipment; or configuring duration of a cell working state of the serving cell according to received duration of a cell working state of a neighboring cell.

Optionally, the network-side device further includes:

a transmitter 53, configured to send the duration of the cell working state of the serving cell stored in the memory 52 to the neighboring cell.

Optionally, the duration of the cell working state includes the duration of the working state of the serving cell and the duration of the working state of the neighboring cell;

working states of the serving cell and an intra-frequency neighboring cell in a first set time period are the same; and working states of the serving cell and an inter-frequency neighboring cell in a second set time period are different, where the first set time period is a part or all of a time period during which the serving cell performs signal sending, and the second set time period is a part or all of the time period during which the serving cell performs signal sending and a part or all of a time period during which the serving cell does not perform signal sending.

Optionally, the processor 51 is further configured to: after determining the time for the user equipment to perform measurement and/or synchronization, determine indication information that indicates the time for user equipment to perform measurement and/or synchronization, and transmit the indication information to the memory 52; the transmitter 53 is configured to send the indication information stored in the memory 52 to the user equipment.

Optionally, the indication information includes information indicating the duration of the cell working state; and/or the indication information includes subframe scheduling information that indicates the time for the user equipment to perform measurement and/or synchronization.

Optionally, the indication information includes the subframe scheduling information that indicates the time for the user equipment to perform measurement and/or synchronization; and the subframe scheduling information includes a discontinuous reception cycle DRX cycle, where the DRX cycle includes an active-state time of the user equipment and an inactive-state time of the user equipment, and the active-state time of the user equipment is within the range of the duration for which the serving cell of the user equipment performs signal sending.

Optionally, the indication information includes the subframe scheduling information that indicates the time for the user equipment to perform measurement; and the subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell performs signal sending.

Figure 6:
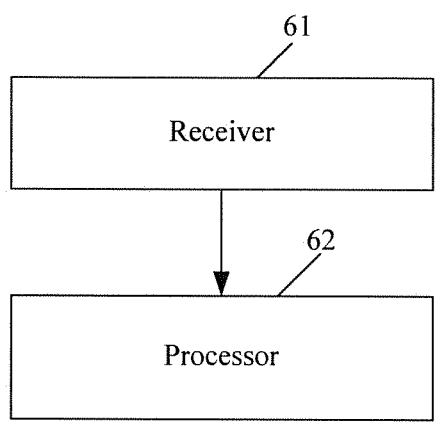
FIG. 6 is a schematic structural diagram of user equipment according to Embodiment 1 of the present invention.

As shown in FIG. 6, FIG. 6 is a schematic structural diagram of user equipment according to Embodiment 1 of the present invention, and the user equipment includes:

a receiver 61, configured to receive indication information that is sent by a network-side device according to duration of a cell working state and that indicates a time for the user equipment to perform measurement and/or synchronization, and transmit the received indication information to a processor 62, where the duration of the cell working state includes duration for which a cell performs signal sending and/or duration for which the cell does not perform signal sending; and the processor 62, configured to determine, according to the indication information received by the receiver 61, the time to perform measurement and/or synchronization, and perform measurement and/or synchronization within the time to perform measurement and/or synchronization, where the time to perform measurement is within a range of duration for which a to-be-measured cell performs signal sending, and the time to perform synchronization is within a range of duration for which a serving cell performs signal sending.

Optionally, the indication information includes information indicating the duration of the cell working state; and/or the indication information includes subframe scheduling information that indicates the time for the user equipment to perform measurement and/or synchronization.

The following further describes a method and an apparatus for supporting UE in task execution in other embodiments of the present invention.

Figure 7:
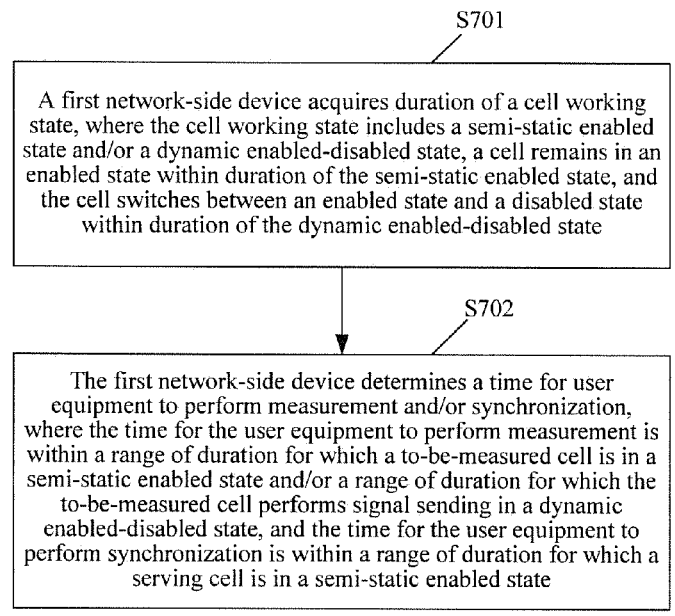
FIG. 7 is a flowchart of a method for supporting UE in task execution according to Embodiment 3 of the present invention.

As shown in FIG. 7, FIG. 7 is a flowchart of a method for supporting UE in task execution according to Embodiment 3 of the present invention, and the method includes the following steps:

S701: A first network-side device acquires duration of a cell working state, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state.

S702: The first network-side device determines a time for user equipment to perform measurement and/or synchronization, where the time for the user equipment to perform measurement is within a range of duration for which a to-be-measured cell is in a semi-static enabled state and/or a range of duration for which the to-be-measured cell performs signal sending in a dynamic enabled-disabled state, and the time for the user equipment to perform synchronization is within a range of duration for which a serving cell is in a semi-static enabled state.

In a specific implementation process, the first network-side device may be a serving cell on which the UE camps, and the cell working state may include a working state of the serving cell and/or a working state of a neighboring cell. After determining the duration of the cell working state, the first network-side device may determine, according to the duration of the cell working state, the time for the UE in the serving cell to perform measurement and/or synchronization, and may instruct the UE to perform measurement and/or synchronization at a correct time. For meanings of measurement and synchronization in this embodiment of the present invention, reference may be made to the description in Embodiment 1, and details are not described herein again.

Figure 8:
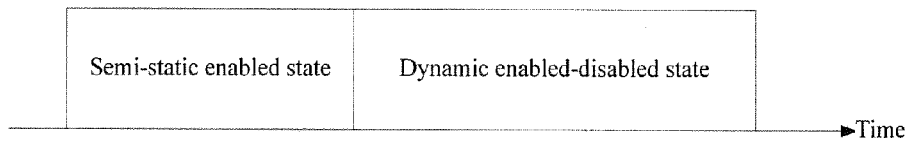
FIG. 8 is a schematic diagram of a working state of a cell.

As shown in FIG. 8, in this embodiment of the present invention, the cell working state may include two cyclically alternating working states: a semi-static enabled state and a dynamic enabled-disabled state. Each cycle may be referred to as a state period, where duration of the semi-static enabled state in the state period does not need to be fixed. For example, a state period is 60 ms, duration of the semi-static enabled state in a previous state period is 20 ms, and duration of the semi-static enabled state in a current state period may changes to 30 ms. In this embodiment of the present invention, duration of the semi-static enabled state or duration of the dynamic enabled-disabled state may also be set to 0 ms. Within the duration of the semi-static enabled state, the cell remains in the enabled state, and sends, on a set subframe or all subframes that can be used for sending a reference signal, a reference signal used for the UE to perform measurement and/or synchronization, for example, a common reference signal (Common Reference Signal, CRS). The set subframe may include multiple successive subframes for sending reference signals, or may include one or more successive subframes for sending reference signals at equal subframe intervals. The cell may further transmit, in the enabled state, synchronization channel (SCH) data, physical broadcast channel (PBCH) data, system information block (SIB) data, and the like. In the dynamic enabled-disabled state, the cell may switch between the enabled state and the disabled state. When the cell has no service, the cell may be disabled in the dynamic enabled-disabled state. In the dynamic enabled-disabled state, the cell may not perform signal sending, or may normally perform signal sending. Besides, the cell may further send a particular signal, for example, a discovery reference signal (DRS), according to a set pattern, and stop sending other signals. The set signal is used for the UE or another cell to identify a cell that is in a state of sending a set signal, or is used to provide, in the state, a radio synchronization signal for another cell. Besides the two cyclically alternating working states: the semi-static enabled state and the dynamic enabled-disabled state, the cell may remain in a normally enabled state when busy with services.

It should be noted that the first network-side device may acquire only the duration of the semi-static enabled state of the cell, and determine, according to the duration of the semi-static enabled state of the cell, the time for the UE to perform measurement and/or synchronization; or may acquire only the duration of the dynamic enabled-disabled state of the cell, and determine, according to the duration of the dynamic enabled-disabled state of the cell, the time for the UE to perform measurement and/or synchronization; or may acquire both the duration of the semi-static enabled state of the cell and the duration of the dynamic enabled-disabled state.

According to the foregoing method, a first network-side device may determine, according to acquired duration of a cell working state, a time for UE to perform measurement and/or synchronization. Because the time to perform measurement is within a range of duration for which a to-be-measured cell is in a semi-static enabled state or performs signal sending in a dynamic enabled-disabled state, and the time to perform synchronization is within a range of duration for which a serving cell is in a semi-static enabled state, the UE can be instructed to correctly perform measurement and/or synchronization. According to this method, not only can accuracy of a result of measurement and/or synchronization performed by UE be ensured, but also disabling of a cell when the cell has no service can be implemented; therefore, energy can be saved for the cell, signal interference from the cell to another cell can be reduced, and system performance can be performed.

Optionally, the acquiring, by a first network-side device, duration of a cell working state includes:

configuring, by the first network-side device, duration of a cell working state of a cell; or acquiring, by the first network-side device, duration, configured by an OAM entity, of a cell working state.

In a specific implementation process, if the UE only needs to perform measurement on the serving cell and/or perform synchronization with the serving cell, the first network-side device may directly configure duration of a cell working state of the serving cell, or acquire duration, configured by the OAM entity, of a cell working state of the serving cell; if the UE also needs to perform measurement on the neighboring cell, the first network-side device also needs to acquire duration of a cell working state of the neighboring cell. The first network-side device may determine the duration of the cell working state of the serving cell and the duration of the cell working state of the neighboring cell by performing signaling interaction with the neighboring cell. Specifically, the first network-side device and the neighboring cell may exchange working state information with each other by using a wireless or wired interface, for example, by using an X2 interface, an S1 interface, or an air interface. The first network-side device may also directly acquire the duration of the cell working state of the serving cell and the duration of the cell working state of the neighboring cell that are configured by the OAM entity.

Optionally, the configuring, by the first network-side device, duration of a cell working state includes:

configuring, by the first network-side device, duration of a cell working state of the serving cell according to service information of the serving cell of the user equipment; or configuring, by the first network-side device, duration of a cell working state of the serving cell according to received duration of a cell working state of a neighboring cell.

Optionally, after the configuring, by the first network-side device, duration of a cell working state of the serving cell, the method further includes:

notifying, by the first network-side device, the duration of the cell working state of the serving cell to the neighboring cell.

As an implementable manner, the first network-side device may first configure the duration of the cell working state of the serving cell according to service information that indicates service busyness of the serving cell, and then may send the configured duration of the cell working state of the serving cell to the neighboring cell; the neighboring cell may configure duration of a cell working state of the neighboring cell according to the received duration of the cell working state of the serving cell, and send the configured duration of the cell working state of the neighboring cell to the first network-side device. Optionally, after receiving the duration of the cell working state of the neighboring cell, the first network-side device may further send information to the neighboring cell, to acknowledge reception of the duration of the cell working state of the neighboring cell. After a set time period, the first network-side device may determine, according to the duration of the cell working state that is determined after interaction with the neighboring cell, configuration information that indicates the duration of the working state of the serving cell and the duration of the working state of the neighboring cell. The set time period herein is known to both the first network-side device and the neighboring cell. The first network-side device and the neighboring cell may determine the set time period by performing information exchange, or may directly acquire a set time period configured by the OAM entity.

As another implementable manner, the first network-side device may first configure the duration of the cell working state of the serving cell according to service information that indicates service busyness of the serving cell, and then may send the configured duration of the cell working state of the serving cell to the neighboring cell; if the neighboring cell cannot perform adaptive configuration on duration of a cell working state of the neighboring cell according to the received duration of the cell working state of the serving cell and service information of the neighboring cell, the neighboring cell may send duration, configured according to the service information of the neighboring cell, of the cell working state to the first network-side device; the first network-side device adaptively adjusts the initially configured duration of the cell working state of the serving cell. Optionally, after receiving the duration of the cell working state of the neighboring cell that is configured by the neighboring cell, the first network-side device adaptively adjusts the initially configured duration of the cell working state of the serving cell, and sends information to the neighboring cell, to acknowledge reception of the duration of the cell working state of the neighboring cell, and/or notifies the neighboring cell of adjusted duration of the cell working state of the serving cell. After a set time period, the first network-side device may determine, according to the duration of the cell working state that is determined after interaction with the neighboring cell, configuration information that indicates the duration of the working state of the serving cell and the duration of the working state of the neighboring cell. The set time period herein is known to both the first network-side device and the neighboring cell. The first network-side device and the neighboring cell may determine the set time period by performing information exchange, or may directly acquire a set time period configured by the OAM entity.

Correspondingly, as an implementable manner, after receiving duration of a cell working state of the neighboring cell, the first network-side device may configure the duration of the cell working state of the serving cell according to the duration of the cell working state of the neighboring cell, and send the configured duration of the cell working state of the serving cell to the neighboring cell. Optionally, after receiving the duration of the cell working state of the serving cell that is sent by the first network-side device, the neighboring cell may send information to the first network-side device, to acknowledge reception of the duration of the cell working state of the serving cell. After a set time period, the first network-side device may determine, according to the duration of the cell working state that is determined after interaction with the neighboring cell, configuration information that indicates the duration of the working state of the serving cell and the duration of the working state of the neighboring cell. The set time period herein is known to both the first network-side device and the neighboring cell. The first network-side device and the neighboring cell may determine the set time period by performing information exchange, or may directly acquire a set time period configured by the OAM entity.

As another implementable manner, the neighboring cell may first configure duration of a cell working state of the neighboring cell according to service information that indicates service busyness of the neighboring cell, and then may send the configured duration of the cell working state of the neighboring cell to the first network-side device; if the first network-side device cannot perform adaptive configuration on duration of a cell working state of the serving cell according to the received duration of the cell working state of the neighboring cell and service information of the serving cell, the first network-side device may further send duration, configured according to the service information of the serving cell, of the cell working state of the serving cell to another network-side device of the neighboring cell; and the neighboring cell adaptively adjusts the initially configured duration of the cell working state of the neighboring cell. Optionally, after receiving the duration of the cell working state of the serving cell, the neighboring cell adaptively adjusts the initially configured duration of the cell working state of the neighboring cell, and sends information to the first network-side device, to acknowledge reception of the duration of the cell working state of the serving cell, and/or notifies the first network-side device of adjusted duration of the cell working state of the neighboring cell. After a set time period, the first network-side device may determine, according to the duration of the cell working state that is determined after interaction with the neighboring cell, configuration information that indicates the duration of the working state of the serving cell and the duration of the working state of the neighboring cell. The set time period herein is known to both the first network-side device and the neighboring cell. The first network-side device and the neighboring cell may determine the set time period by performing information exchange, or may directly acquire a set time period configured by the OAM entity.

As can be known according to the foregoing process in which the UE executes a task of measuring the neighboring cell, when the UE needs to perform measurement on the neighboring cell, the duration, acquired by the first network-side device, of the cell working state includes the duration of the working state of the serving cell and the duration of the working state of the neighboring cell, where the working states of the serving cell and the neighboring cell need to satisfy the following relationships:

working states of the serving cell and an intra-frequency neighboring cell in a first set time period are the same; and working states of the serving cell and an inter-frequency neighboring cell in a second set time period are different.

The first set time period is a part or all of a time period of the semi-static enabled state of the serving cell. In this way, when the serving cell is in a semi-static enabled state, the UE can perform measurement on the intra-frequency neighboring cell that is also in a semi-static enabled state. Likewise, when the intra-frequency neighboring cell is in a semi-static enabled state, UE in the intra-frequency neighboring cell can perform measurement on the serving cell that is also in the semi-static enabled state. The second set time period is a part or all of the time period of the semi-static enabled state of the serving cell and a part or all of a time period of a dynamic enabled-disabled state of the serving cell. In this way, when the serving cell is in a dynamic enabled-disabled state, the UE can perform measurement on the inter-frequency neighboring cell that is in a semi-static enabled state. Likewise, when the inter-frequency neighboring cell is in a dynamic enabled-disabled state, UE in the inter-frequency neighboring cell can perform measurement on the serving cell that is in the semi-static enabled state.

In this embodiment of the present invention, after determining the time for the user equipment to perform measurement and/or synchronization, the first network-side device may instruct, according to the determined time, the user equipment to perform measurement and/or synchronization, that is, after the determining, by the first network-side device, a time for user equipment to perform measurement and/or synchronization, the method further includes:

sending, by the first network-side device to the user equipment, indication information that indicates the time for the user equipment to perform measurement and/or synchronization.

Optionally, the indication information includes information indicating the duration of the cell working state; and/or the indication information includes subframe scheduling information that indicates the time for the user equipment to perform measurement and/or synchronization.

In a specific implementation process, there may be specifically two manners in which the first network-side device indicates the time for the user equipment to perform measurement and/or synchronization. One manner is directly sending, to the UE, information indicating the duration of the cell working state, so that the UE determines, according to an agreement made in advance with the network side, the time to perform measurement and/or synchronization. This manner applies to UE in an evolved version. The other manner is determining, according to the determined time for the UE to perform measurement and/or synchronization, subframe scheduling information used for the UE to perform measurement and/or synchronization, and sending the subframe scheduling information to the UE. This manner applies to UE in an evolved version or a non-evolved version. The manners are separately described below.

The first manner: Send, to the UE, information indicating the duration of the cell working state.

In a specific implementation process, for UE in an evolved version such as 3GPP Release 12 (R12), after the duration of the cell working state is determined, information indicating the duration of the cell working state may be sent to the UE, so that the UE in the evolved version such as R12 can perform measurement and/or synchronization according to the duration of the cell working state. Specifically, when the UE needs to perform measurement, the first network-side device may send only the duration of the semi-static enabled state of the to-be-measured cell to the UE, or may send only duration of the dynamic enabled-disabled state of the to-be-measured cell to the UE, or may send both the duration of the semi-static enabled state and duration of the dynamic enabled-disabled state of the to-be-measured cell to the UE. When the UE needs to perform synchronization, the first network-side device may send only the duration of the semi-static enabled state of the serving cell to the UE, or may send duration of the dynamic enabled-disabled state of the serving cell to the UE, or may send both the duration of the semi-static enabled state and duration of the dynamic enabled-disabled state of the serving cell to the UE. A process in which the UE performs measurement and/or synchronization according to the duration of the cell working state is specifically:

the UE performs measurement within the duration for which the to-be-measured cell is in the semi-static enabled state and/or the duration for which the to-be-measured cell is an enabled state in the dynamic enabled-disabled state; and/or the UE performs synchronization within the duration for which the serving cell is in the semi-static enabled state.

Specifically, in one manner, the UE may perform measurement on the serving cell and/or perform synchronization with the serving cell within duration of the semi-static enabled state or a normally enabled state of the serving cell. The UE may also perform measurement, within the duration of the semi-static enabled state or the normally enabled state of the serving cell, on the intra-frequency neighboring cell that is also in a semi-static enabled state or a normally enabled state, and may perform measurement, within the duration of the dynamic enabled-disabled state of the serving cell, on the inter-frequency neighboring cell that is in a semi-static enabled state or a normally enabled state, or may perform measurement, within the duration of the normally enabled state of the serving cell and according to an inter-frequency measurement interval configured by a base station, on an inter-frequency neighboring cell that is in a semi-static enabled state or a normally enabled state. Optionally, the UE may directly perform measurement on the neighboring cell according to information that is sent by the first network-side device and that indicates the duration for which the neighboring cell is in the semi-static enabled state or the normally enabled state, without considering the working state of the serving cell, and in this case, the network-side device already predetermines the working states of the serving cell and the neighboring cell, so that the working states of the two can satisfy the foregoing conditions on which the UE performs measurement.

In the foregoing manner, the UE may determine the duration of the working state of the serving cell and/or the duration of the working state of the neighboring cell according to information that is sent by the first network-side device and that indicates the duration of the working state of the serving cell and/or the duration of the working state of the neighboring cell. There may be multiple manners in which the UE determines the duration of the cell working state of the serving cell and the duration of the cell working state of the neighboring cell: the UE may determine the duration of the cell working state of the neighboring cell according to a preset correspondence between the cell working state of the serving cell and the cell working state of the neighboring cell after receiving the duration of the cell working state of the serving cell sent by the first network-side device; and the UE may further determine the duration of the cell working state of the serving cell according to the correspondence between the cell working state of the serving cell and the cell working state of the neighboring cell after receiving the duration of the cell working state of the neighboring cell sent by the first network-side device. Herein, a correspondence between the cell working state of the serving cell and a cell working state of an intra-frequency neighboring cell may be that the working states of the serving cell and the intra-frequency neighboring cell in the first set time period are the same, and a correspondence between the cell working state of the serving cell and a cell working state of an inter-frequency neighboring cell may be that the working states of the serving cell and the inter-frequency neighboring cell in the second set time period are different. A relationship between the working state of the serving cell and the working state of the neighboring cell is described in detail in the following content in this embodiment of the present invention, and details are not described herein again. Besides, the UE may further receive the duration of the cell working state of the serving cell and the duration of the cell working state of the neighboring cell that are sent by the first network-side device.

In another manner, the UE may execute measurement according to a set signal, for example, a discovery reference signal DRS, that is sent by the cell in the dynamic enabled-disabled state. In this case, the UE may execute the foregoing measurement according to a set signal that is sent by the serving cell and/or the neighboring cell in the dynamic enabled-disabled state. For example, the UE may perform measurement on the serving cell according to the foregoing signal that is sent by the serving cell in the dynamic enabled-disabled state, and may perform measurement on the neighboring cell according to the set signal that is sent by the neighboring cell in the dynamic enabled-disabled state.

It should be noted that the UE may combine the foregoing two manners when specifically executing measurement. For example, the UE may perform measurement on the serving cell when the serving cell is in the semi-static enabled state, or may perform measurement by using a set signal that is sent by the serving cell in the dynamic enabled-disabled state; the UE may perform measurement on the neighboring cell when the neighboring cell is in the semi-static enabled state, or may perform measurement on the neighboring cell by using a set signal that is sent by the neighboring cell in the dynamic enabled-disabled state.

The second manner: Send subframe scheduling information for performing measurement and/or synchronization to the UE.

In a specific implementation process, for UE in a low version such as R8, R9, R10, or R11, subframe scheduling information determined according to duration of different cell working states of a cell may be sent to the UE. For UE in R8 and R9, the subframe scheduling information may include a discontinuous reception cycle (DRX cycle), and for UE in R10 and R11, the subframe scheduling information may include a restrictive measurement set in addition to the DRX cycle. The two subframe scheduling manners are separately described blow.

Manner 1: The subframe scheduling information includes a discontinuous reception cycle DRX cycle, which is used to indicate the time for the UE to perform measurement and/or synchronization, where the DRX cycle includes an active-state time of the UE and an inactive-state time of the UE, and the active-state time of the user equipment is within the range of the duration of the semi-static enabled state of the serving cell of the user equipment.

Figure 9:
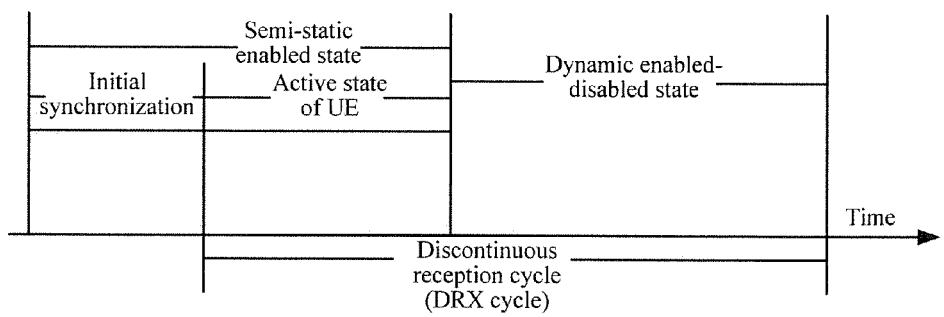
FIG. 9 is a schematic configuration diagram of a DRX cycle.

In a specific implementation process, for the UE in R8 and R9, a DRX cycle may be configured. The UE may perform measurement on the serving cell and/or perform synchronization with the serving cell in the active-state time of the UE within the DRX cycle, and may also perform measurement on the intra-frequency neighboring cell in the active-state time of the UE within the DRX cycle. Therefore, the DRX cycle may be configured, so that the active-state time of the UE is within the duration of the semi-static enabled state of the serving cell, and the inactive-state time of the UE is within the duration of the dynamic enabled-disabled state of the serving cell; as shown in FIG. 9, FIG. 9 is a schematic configuration diagram of a DRX cycle, and a process in which the UE executes measurement, synchronization, and/or another task within the received DRX cycle is as follows:

The UE executes a synchronization task.

The synchronization in this embodiment of the present invention may include initial synchronization and/or synchronization tracking. Because the UE may perform initial synchronization for a time period before the active-state time of the UE in the DRX cycle, the first network-side device may configure a start time of the active-state time of the UE to be after a start time of the duration of the semi-static enabled state of the serving cell, and a specific length of time for performing initial synchronization may be set according to a different demand. The first network-side device may specifically notify, to the UE, the configured start of the active-state time of the UE in the DRX cycle by using shortDRX-Cycle/longDRX-Cycle and drxStartOffset or other signaling. The cell needs to send at least a synchronization reference signal, for example, a CRS within duration of the initial synchronization; besides, the cell may further perform data transmission within the duration of the initial synchronization. After entering an active state, the UE may perform synchronization tracking within the duration of the semi-static enabled state of the serving cell.

The UE executes measurement of the serving cell.

The measurement of the serving cell herein includes at least one of RRM measurement, RLM measurement, and CSI measurement. The UE specifically performs measurement on the serving cell in the active-state time of the UE in the DRX cycle.

The UE executes measurement of the intra-frequency neighboring cell.

The measurement of the intra-frequency neighboring cell herein includes at least one of RRM measurement and CSI measurement.

Figure 10:
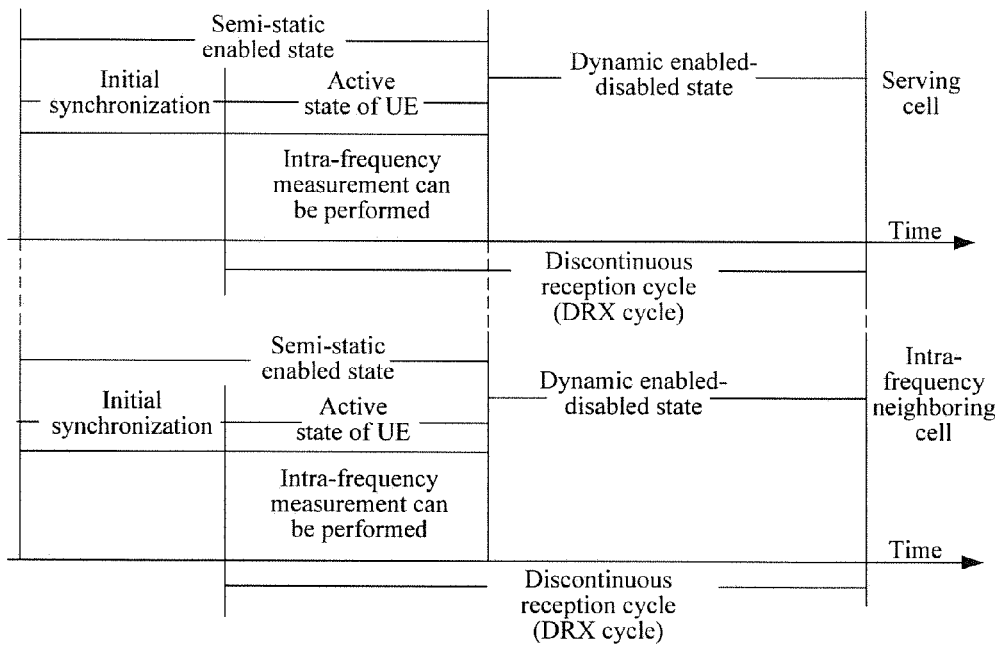
FIG. 10 is a schematic diagram of measurement of an intra-frequency neighboring cell executed by UE.

In a specific implementation process, the UE may perform measurement on the intra-frequency neighboring cell, which is also in the semi-static enabled state, in the active-state time in the DRX cycle, that is, within the duration of the semi-static enabled state of the serving cell. This requires that when the serving cell is in the semi-static enabled state, the intra-frequency neighboring cell is also in the semi-static enabled state. During specific implementation, overlapping between duration of semi-static enabled states of different intra-frequency cells may be implemented in a manner of configuration by the OAM entity or in a manner of signaling interaction between the cells. As shown in FIG. 10, FIG. 10 is a schematic diagram of measurement of an intra-frequency neighboring cell executed by UE.

The UE executes measurement of the inter-frequency neighboring cell.

The measurement of the inter-frequency neighboring cell herein includes at least one of RRM measurement and CSI measurement.

When the serving cell of the UE is configured to be in a state in which the semi-static enabled state and the dynamic enabled-disabled state cyclically alternate with each other, while the working state of the to-be-measured inter-frequency neighboring cell is the normally enabled state, the UE may perform measurement on the inter-frequency neighboring cell in the inactive-state time of the UE in the DRX cycle, that is, within the duration of the dynamic enabled-disabled state of the serving cell.

When the serving cell of the UE is in the normally enabled state, and the working state of the to-be-measured inter-frequency neighboring cell is configured to be in a state in which the semi-static enabled state and the dynamic enabled-disabled state cyclically alternate with each other, the first network-side device may configure an inter-frequency measurement interval of the UE to be within the duration of the semi-static enabled state of the to-be-measured inter-frequency neighboring cell.

Figure 11:
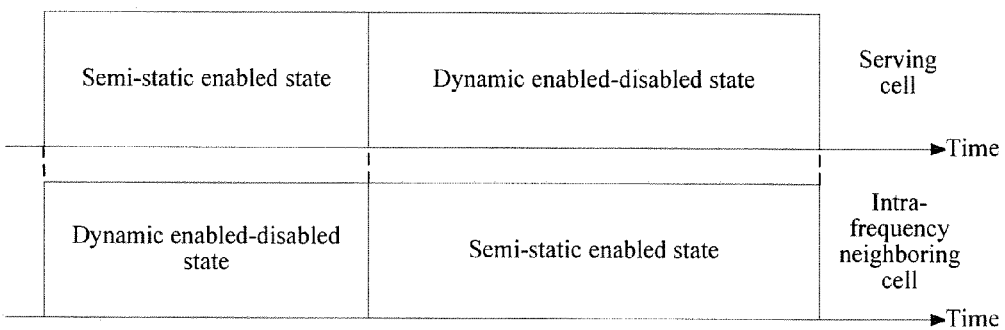
FIG. 11 is a schematic diagram of a configuration in which different working states of a serving cell and an inter-frequency neighboring cell complement each other.
Figure 12:
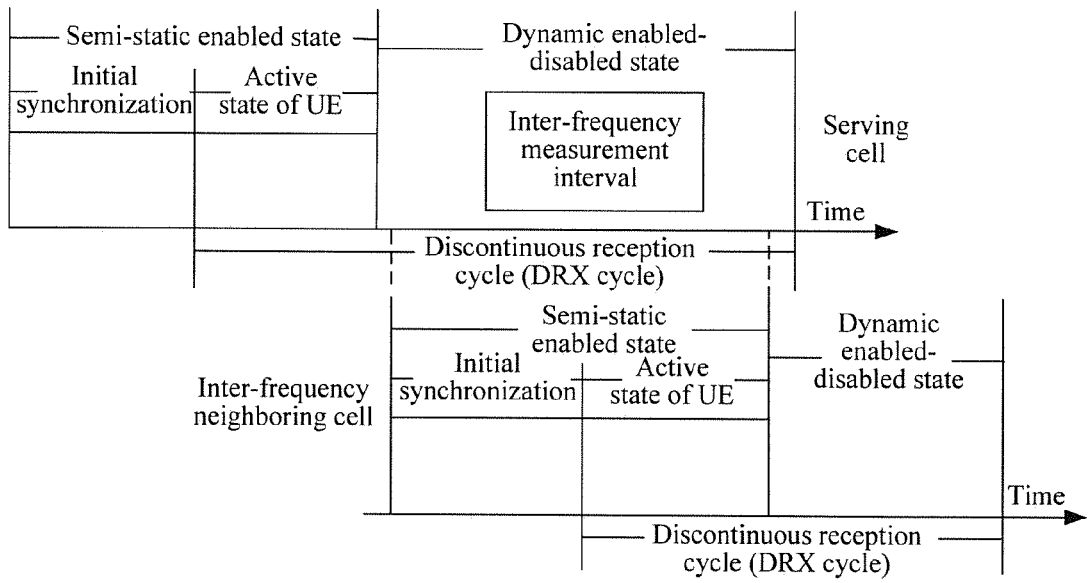
FIG. 12 is a schematic diagram of a configuration in which different working states of a serving cell and an inter-frequency neighboring cell overlap each other.

When both the serving cell of the UE and the inter-frequency neighboring cell are configured to be in a state in which the semi-static enabled state and the dynamic enabled-disabled state cyclically alternate with each other, measurement of the inter-frequency neighboring cell is implemented in two manners. One manner is implementing a configuration in which different working states of the serving cell and the inter-frequency neighboring cell complement each other. As shown in FIG. 11, when the serving cell is in the semi-static enabled state, the inter-frequency neighboring cell is in the dynamic enabled-disabled state, or when the serving cell is in the dynamic enabled-disabled state, the inter-frequency neighboring cell is in the semi-static enabled state. In this way, the UE can perform measurement on the inter-frequency neighboring cell, which is in the semi-static enabled state, in the inactive-state time in the DRX cycle, that is, within the duration of the dynamic enabled-disabled state of the serving cell. The other manner is implementing a configuration in which working states of the serving cell and the inter-frequency neighboring cell overlap each other. As shown in FIG. 12, within the duration for which the serving cell is in the semi-static enabled state, the inter-frequency neighboring cell is in the dynamic enabled-disabled state for some time, and is in the semi-static enabled state for some time; when the serving cell is in the dynamic enabled-disabled state, the inter-frequency neighboring cell is in the semi-static enabled state for some time, and is in the dynamic enabled-disabled state for some time. In this case, if the UE needs to execute measurement of the inter-frequency neighboring cell, signaling may be sent to the UE when the UE is in an active state, so that the UE is in a continuous reception state; an inter-frequency measurement interval is configured for the UE, so that the inter-frequency measurement interval is within the duration of the semi-static enabled state of the to-be-measured inter-frequency neighboring cell, and after the UE completes inter-frequency measurement, signaling is sent, so that the UE returns to a DRX state. Alternatively, when the UE needs to execute measurement of the inter-frequency neighboring cell, the UE is handed over to a neighboring cell that is in a normally enabled state, for example, the UE is handed over from a micro cell to a macro cell, so that the UE completes, in the cell after the handover, measurement of the target inter-frequency neighboring cell.

As can be known from the foregoing process of measuring the inter-frequency neighboring cell, adjacent inter-frequency cells need to know states of each other. During specific implementation, the cells may learn the states of each other in a manner of configuration by the OAM entity or in a manner of signaling interaction.

The UE executes a data transmission task.

Besides the foregoing measurement and synchronization, the UE further needs to perform normal data transmission. The UE specifically performs data transmission in the active-state time of the UE in the DRX cycle, that is, within the duration of the semi-static enabled state of the serving cell. During specific implementation, onDurationTimer may be configured, so that a time on the onDurationTimer is not less than a time during which the UE performs data transmission, and if the UE still cannot complete data transmission before the serving cell enters the dynamic enabled-disabled state, a DRX Command MAC control element may be configured, so that the UE suspends data transmission and enters an inactive state.

For the UE in R10 and R11 versions, in addition to performing measurement and/or synchronization by using the DRX cycle, measurement may also be performed by configuring a restrictive measurement subframe set, which is as follows:

Manner 2: The subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell is in the semi-static enabled state and/or the range of the duration for which the to-be-measured cell performs signal sending when being in the dynamic enabled-disabled state.

During specific implementation, the first network-side device may configure a restrictive measurement subframe set, so that all subframes in the restrictive measurement subframe set are within the duration of the semi-static enabled state of the to-be-measured cell and/or within the time during which the to-be-measured cell performs signal sending in the dynamic enabled-disabled state. Certainly, if the to-be-measured cell is not configured to be in a state in which the semi-static enabled state and the dynamic enabled-disabled state cyclically alternate with each other, that is, the to-be-measured cell is in a normally enabled state, all the subframes in the restrictive measurement subframe set may be within duration of the normally enabled state of the to-be-measured cell. The measurement herein includes at least one of RRM measurement, RLM measurement, and CSI measurement.

Figure 13:
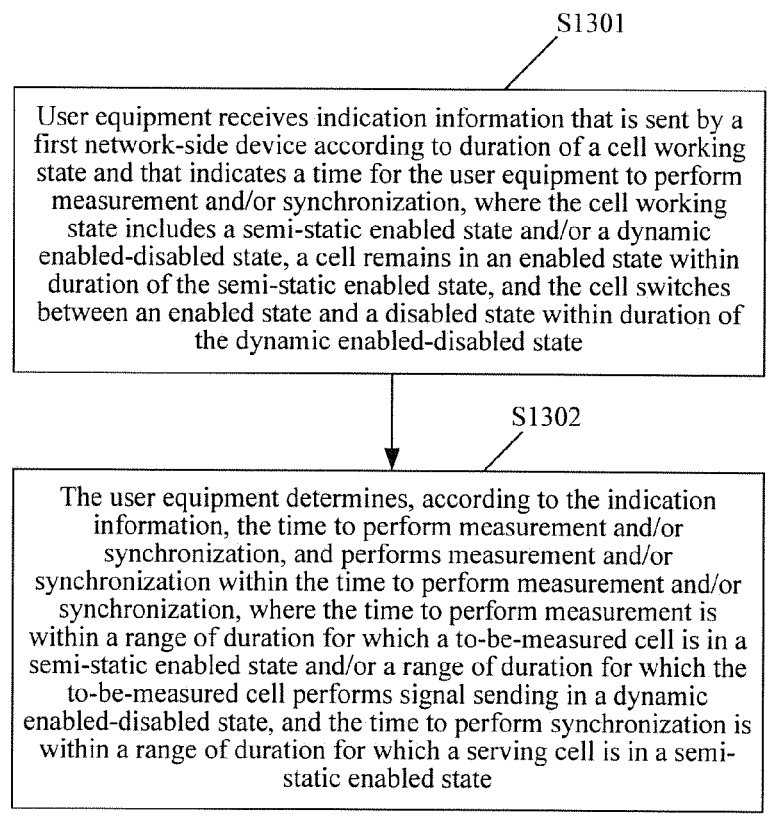
FIG. 13 is a flowchart of a method for supporting UE in task execution according to Embodiment 4 of the present invention.

As shown in FIG. 13, FIG. 13 is a flowchart of a method for supporting UE in task execution according to Embodiment 4 of the present invention, and the method includes:

S1301: User equipment receives indication information that is sent by a first network-side device according to duration of a cell working state and that indicates a time for the user equipment to perform measurement and/or synchronization, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state.

S1302: The user equipment determines, according to the indication information, the time to perform measurement and/or synchronization, and performs measurement and/or synchronization within the time to perform measurement and/or synchronization, where the time to perform measurement is within a range of duration for which a to-be-measured cell is in a semi-static enabled state and/or a range of duration for which the to-be-measured cell performs signal sending in a dynamic enabled-disabled state, and the time to perform synchronization is within a range of duration for which a serving cell is in a semi-static enabled state.

Optionally, the indication information includes information indicating the duration of the cell working state; and/or the indication information includes subframe scheduling information that indicates the time for the user equipment to perform measurement and/or synchronization.

During specific implementation, for a process in which the UE performs measurement and/or synchronization, reference may be made to the content described in Embodiment 3, and details are not described herein again.

To describe in detail the method for task execution by the UE in the embodiments of the present invention, specific implementation manners are listed below for description.

Figure 14:
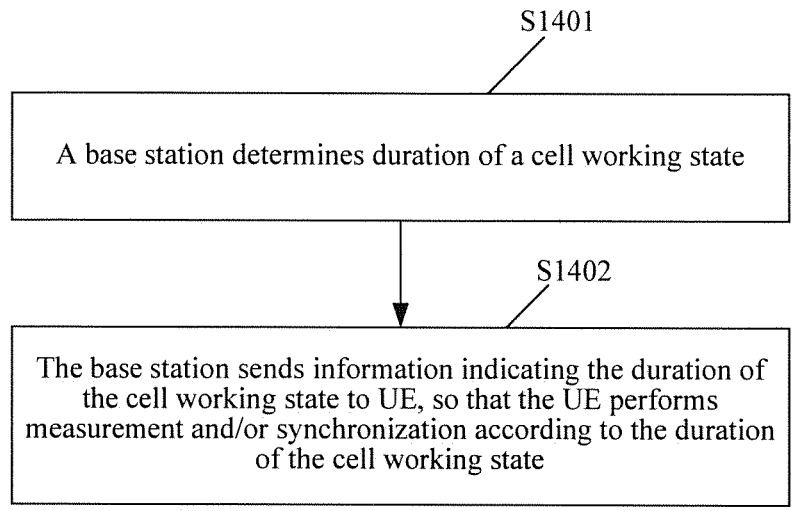
FIG. 14 is a flowchart of a method for supporting UE in task execution according to Embodiment 5 of the present invention.

As shown in FIG. 14, FIG. 14 is a flowchart of a method for supporting UE in task execution according to Embodiment 5 of the present invention, this embodiment is specific for UE in an evolved version such as R12, and the method includes:

S1401: A base station determines duration of a cell working state.

Herein, if UE needs to perform measurement on a serving cell and/or perform synchronization with a serving cell, the base station only needs to determine duration of a cell working state of the serving cell; if the UE needs to perform measurement on a neighboring cell, the base station needs to be determine the duration of the cell working state of the serving cell and duration of a cell working state of the to-be-measured neighboring cell. During specific implementation, the base station of the serving cell may acquire the duration of the cell working state of the neighboring cell through signaling interaction with a neighboring base station, or may directly acquire duration, configured by an OAM entity, of a cell working state. The cell working state may include two cyclically alternating working states: a semi-static enabled state and a dynamic enabled-disabled state, and may further include a normally enabled state.

S1402: The base station sends information indicating the duration of the cell working state to UE, so that the UE performs measurement and/or synchronization according to the duration of the cell working state.

During specific implementation, UE in an evolved version such as R12 may determine, according to the acquired duration of the cell working state, specific time to perform measurement and/or synchronization, and perform measurement and/or synchronization according to the determined time. For example, the UE may perform measurement on the serving cell and/or perform synchronization with the serving cell within duration of a semi-static enabled state or a normally enabled state of the serving cell, and may perform measurement on an intra-frequency neighboring cell, which is also in a semi-static enabled state or a normally enabled state, within the duration of the semi-static enabled state or the normally enabled state of the serving cell; the UE may perform measurement on an inter-frequency neighboring cell, which is in a semi-static enabled state or a normally enabled state, within duration of a dynamic enabled-disabled state of the serving cell, or may perform measurement on an inter-frequency neighboring cell within the duration of the normally enabled state of the serving cell according to an inter-frequency measurement interval configured by the base station.

Figure 15:
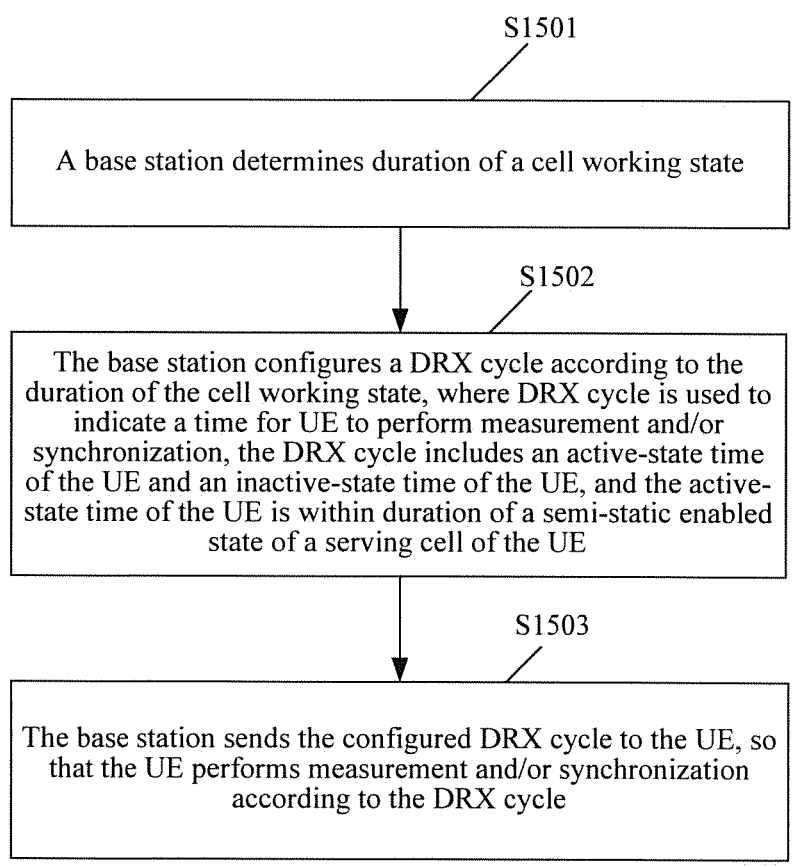
FIG. 15 is a flowchart of a method for supporting UE in task execution according to Embodiment 6 of the present invention.

As shown in FIG. 15, FIG. 15 is a flowchart of a method for supporting UE in task execution according to Embodiment 6 of the present invention, this embodiment may be applied to UE in a relatively low version such as R8 or R9, and may also be applied to UE in a relatively high version such as R10, R11, or R12, and the method includes:

S1501: A base station determines duration of a cell working state.

S1502: The base station configures a DRX cycle according to the duration of the cell working state, where the DRX cycle is used to indicate a time for UE to perform measurement and/or synchronization, the DRX cycle includes an active-state time of the UE and an inactive-state time of the UE, and the active-state time of the UE is within duration of a semi-static enabled state of a serving cell of the UE.

S1503: The base station sends the configured DRX cycle to the UE, so that the UE performs measurement and/or synchronization according to the DRX cycle.

In a specific implementation process, the UE may perform measurement on the serving cell and/or perform synchronization with the serving cell in the active-state time of the UE in the DRX cycle, or may perform measurement on an intra-frequency neighboring cell in the active-state time of the UE, and may perform measurement on an inter-frequency neighboring cell in the inactive-state time of the UE in the DRX cycle. For a process in which the UE specifically executes a measurement and/or synchronization task, reference may be made to the foregoing description in Embodiment 1, and details are not described herein again.

Figure 16:
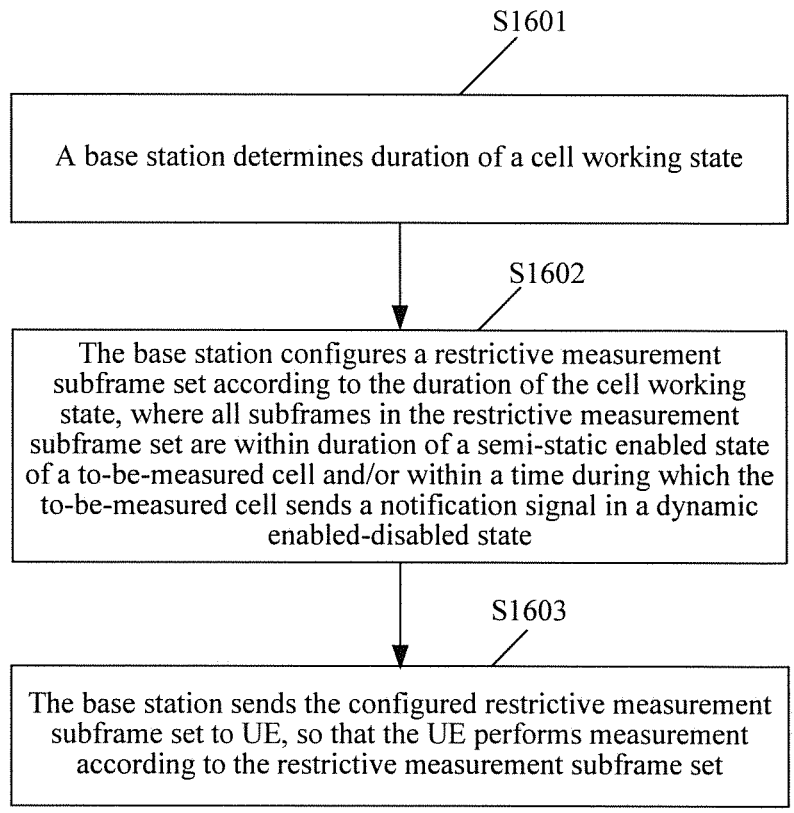
FIG. 16 is a flowchart of a method for supporting UE in measurement task execution according to Embodiment 7 of the present invention.

As shown in FIG. 16, FIG. 16 is a flowchart of a method for supporting UE in measurement task execution according to Embodiment 7 of the present invention, this embodiment may be applied to UE in an R10, R11, or R12 version, and the method includes:

S1601: A base station determines duration of a cell working state.

S1602: The base station configures a restrictive measurement subframe set according to the duration of the cell working state, where all subframes in the restrictive measurement subframe set are within duration of a semi-static enabled state of a to-be-measured cell and/or within a time during which the to-be-measured cell sends a notification signal in a dynamic enabled-disabled state.

S1603: The base station sends the configured restrictive measurement subframe set to UE, so that the UE performs measurement according to the restrictive measurement subframe set.

In a specific implementation process, UE in an R10 or R11 version may perform cell measurement according to the restrictive measurement subframe set configured by the base station. However, if an initial synchronization task or a synchronization tracking task needs to be executed, the foregoing method provided in Embodiment 4 still needs to be used.

Based on the same invention idea, an embodiment of the present invention further provides an apparatus for supporting UE in task execution, which corresponds to the foregoing method for supporting UE in task execution. Because the principle of problem solving by the apparatus in the following embodiment of the present invention is similar to that of the foregoing method for supporting UE in task execution, for implementation of the following apparatuses, reference may be made to the implementation of the foregoing method, and repeated parts are not described again.

Figure 17:
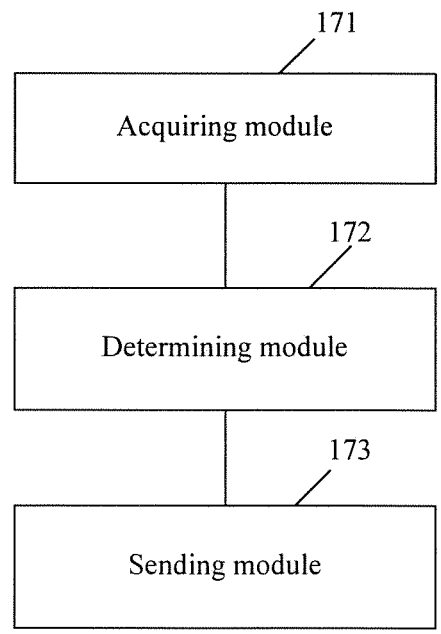
FIG. 17 is a schematic diagram of an apparatus for supporting user equipment in task execution according to Embodiment 3 of the present invention.

As shown in FIG. 17, FIG. 17 is a schematic diagram of an apparatus for supporting user equipment in task execution according to Embodiment 3 of the present invention, and the apparatus includes:

an acquiring module 171, configured to acquire duration of a cell working state, and transmit the acquired duration to a determining module 172, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state; and the determining module 172, configured to receive the duration acquired by the acquiring module 171, and determine a time for user equipment to perform measurement and/or synchronization, where the time for the user equipment to perform measurement is within a range of duration for which a to-be-measured cell is in a semi-static enabled state and/or a range of duration for which the to-be-measured cell performs signal sending in a dynamic enabled-disabled state, and the time for the user equipment to perform synchronization is within a range of duration for which a serving cell is in a semi-static enabled state.

Optionally, the acquiring module 171 is specifically configured to:

configure duration of a cell working state of a cell; or
acquire duration, configured by an Operation, Administration and Maintenance OAM entity, of a cell working state.

Optionally, the acquiring module 171 is specifically configured to configure duration of a cell working state according to the following step:

configuring duration of a cell working state of the serving cell according to service information of the serving cell of the user equipment; or
configuring duration of a cell working state of the serving cell according to received duration of a cell working state of a neighboring cell.

Optionally, the acquiring module 171 is specifically configured to notify the duration of the cell working state of the serving cell to the neighboring cell after configuring the duration of the cell working state of the serving cell.

Optionally, the duration of the cell working state includes the duration of the working state of the serving cell and the duration of the working state of the neighboring cell;

working states of the serving cell and an intra-frequency neighboring cell in a first set time period are the same; and
working states of the serving cell and an inter-frequency neighboring cell in a second set time period are different, where
the first set time period is a part or all of a time period of the semi-static enabled state of the serving cell, and the second set time period is a part or all of the time period of the semi-static enabled state of the serving cell and a part or all of a time period of a dynamic enabled-disabled state of the serving cell.

Optionally, the apparatus further includes:

a sending module 173, configured to: after the determining module 172 determines the time for the user equipment to perform measurement and/or synchronization, send, to the user equipment, indication information that indicates the time for the user equipment to perform measurement and/or synchronization.

Optionally, the indication information includes information indicating the duration of the cell working state; and/or
the indication information includes subframe scheduling information that indicates the time for the user equipment to perform measurement and/or synchronization.

Optionally, the indication information includes the subframe scheduling information that indicates the time for the user equipment to perform measurement and/or synchronization; and
the subframe scheduling information includes a discontinuous reception cycle DRX cycle, where the DRX cycle includes an active-state time of the user equipment and an inactive-state time of the user equipment, and the active-state time of the user equipment is within the range of the duration for which the serving cell of the user equipment is in the semi-static enabled state.

Optionally, the indication information includes subframe scheduling information that indicates the time for the user equipment to perform measurement; and
the subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell is in the semi-static enabled state and/or the range of the duration for which the to-be-measured cell performs signal sending in the dynamic enabled-disabled state.

Figure 18:
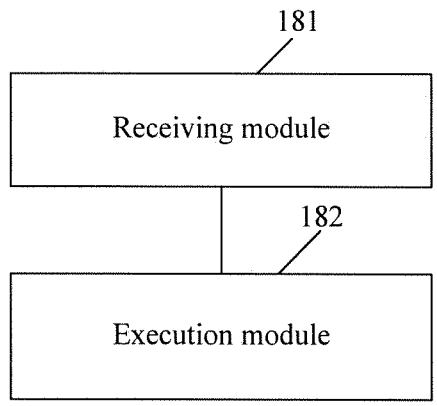
FIG. 18 is a schematic diagram of an apparatus for supporting user equipment in task execution according to Embodiment 4 of the present invention.

As shown in FIG. 18, FIG. 18 is a schematic diagram of an apparatus for supporting user equipment in task execution according to Embodiment 4 of the present invention, and the apparatus includes:

a receiving module 181, configured to receive indication information that is sent by a first network-side device according to duration of a cell working state and that indicates a time for user equipment to perform measurement and/or synchronization, and transmit the received indication information to an execution module 182, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state; and the execution module 182, configured to determine, according to the indication information received by the receiving module 181, the time to perform measurement and/or synchronization, and perform measurement and/or synchronization within the time to perform measurement and/or synchronization, where the time to perform measurement is within a range of duration for which a to-be-measured cell is in a semi-static enabled state and/or a range of duration for which the to-be-measured cell performs signal sending in a dynamic enabled-disabled state, and the time to perform synchronization is within a range of duration for which a serving cell is in a semi-static enabled state.

Optionally, the indication information includes information indicating the duration of the cell working state; and/or the indication information includes subframe scheduling information that indicates the time for the user equipment to perform measurement and/or synchronization.

Figure 19:
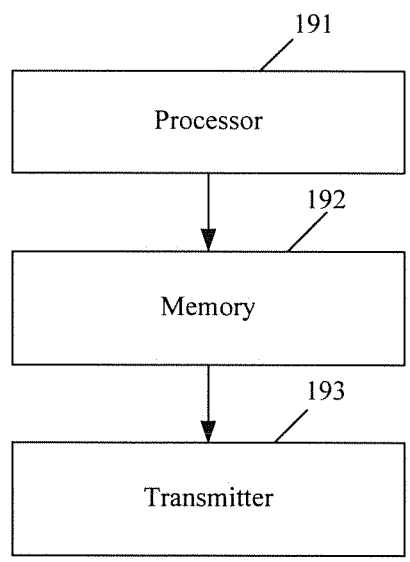
FIG. 19 is a schematic structural diagram of a network-side device according to Embodiment 2 of the present invention.

As shown in FIG. 19, FIG. 19 is a schematic structural diagram of a network-side device according to Embodiment 2 of the present invention, and the network-side device includes:

a processor 191, configured to acquire duration of a cell working state, determine a time for user equipment to perform measurement and/or synchronization, and transmit the determined time to a memory 192, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state; and the time for the user equipment to perform measurement is within a range of duration for which a to-be-measured cell is in a semi-static enabled state and/or a range of duration for which the to-be-measured cell performs signal sending in a dynamic enabled-disabled state, and the time for the user equipment to perform synchronization is within a range of duration for which a serving cell is in a semi-static enabled state; and the memory 192, configured to store the time, determined by the processor 191, for the user equipment to perform measurement and/or synchronization.

Optionally, the processor 191 is specifically configured to:
configure duration of a cell working state of a cell; or
acquire duration, configured by an Operation, Administration and Maintenance OAM entity, of a cell working state.

Optionally, the processor 191 is specifically configured to configure duration of a cell working state according to the following step:
configuring duration of a cell working state of the serving cell according to service information of the serving cell of the user equipment; or
configuring duration of a cell working state of the serving cell according to received duration of a cell working state of a neighboring cell.

Optionally, the network-side device further includes:
a transmitter 193, configured to send the duration of the cell working state of the serving cell stored in the memory 192 to the neighboring cell.

Optionally, the duration of the cell working state includes the duration of the working state of the serving cell and the duration of the working state of the neighboring cell;

working states of the serving cell and an intra-frequency neighboring cell in a first set time period are the same; and working states of the serving cell and an inter-frequency neighboring cell in a second set time period are different, where the first set time period is a part or all of a time period of the semi-static enabled state of the serving cell, and the second set time period is a part or all of the time period of the semi-static enabled state of the serving cell and a part or all of a time period of a dynamic enabled-disabled state of the serving cell.

Optionally, the processor 191 is further configured to: after determining the time for the user equipment to perform measurement and/or synchronization, determine indication information that indicates the time for user equipment to perform measurement and/or synchronization, and transmit the indication information to the memory 192; and the transmitter 193 is configured to send the indication information stored in the memory 192 to the user equipment.

Optionally, the indication information includes information indicating the duration of the cell working state; and/or the indication information includes subframe scheduling information that indicates the time for the user equipment to perform measurement and/or synchronization.

Optionally, the indication information includes the subframe scheduling information that indicates the time for the user equipment to perform measurement and/or synchronization; and the subframe scheduling information includes a discontinuous reception cycle DRX cycle, where the DRX cycle includes an active-state time of the user equipment and an inactive-state time of the user equipment, and the active-state time of the user equipment is within the range of the duration for which the serving cell of the user equipment is in the semi-static enabled state.

Optionally, the indication information includes subframe scheduling information that indicates the time for the user equipment to perform measurement; and the subframe scheduling information includes information indicating a restrictive measurement subframe set, where the restrictive measurement subframe set includes subframes for instructing the user equipment to perform measurement, and all the subframes in the restrictive measurement subframe set are within the range of the duration for which the to-be-measured cell is in the semi-static enabled state and/or the range of the duration for which the to-be-measured cell performs signal sending in the dynamic enabled-disabled state.

Figure 20:
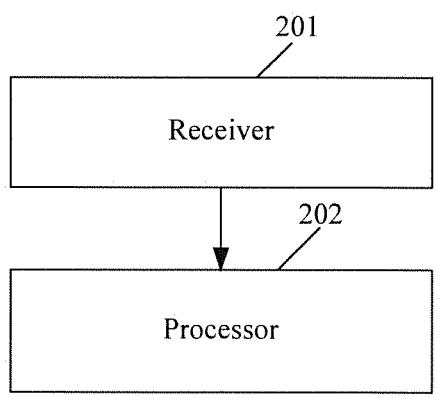
FIG. 20 is a schematic structural diagram of user equipment according to Embodiment 2 of the present invention.

As shown in FIG. 20, FIG. 20 is a schematic structural diagram of user equipment according to Embodiment 4 of the present invention, and the user equipment includes:

a receiver 201, configured to receive indication information that is sent by a network-side device according to duration of a cell working state and that indicates a time for the user equipment to perform measurement and/or synchronization, and transmit the received indication information to a processor 202, where the cell working state includes a semi-static enabled state and/or a dynamic enabled-disabled state, a cell remains in an enabled state within duration of the semi-static enabled state, and the cell switches between an enabled state and a disabled state within duration of the dynamic enabled-disabled state; and the processor 202, configured to determine, according to the indication information received by the receiver 201, the time to perform measurement and/or synchronization, and perform measurement and/or synchronization within the time to perform measurement and/or synchronization, where the time to perform measurement is within a range of duration for which a to-be-measured cell is in a semi-static enabled state and/or a range of duration for which the to-be-measured cell performs signal sending in a dynamic enabled-disabled state, and the time to perform synchronization is within a range of duration for which a serving cell is in a semi-static enabled state.

Optionally, the indication information includes information indicating the duration of the cell working state; and/or the indication information includes subframe scheduling information that indicates the time for the user equipment to perform measurement and/or synchronization.

The foregoing embodiments are merely used to describe in detail the technical solutions of the present application. The descriptions of the foregoing embodiments are merely intended to help understand the method and core idea of the present invention, and shall not be construed as a limitation to the present invention. Any variation or replacement readily figured out by a person skilled in the art within the technical scope disclosed in the present invention shall fall within the protection scope of the present invention.

What is claimed is:

1. A method, comprising:
   acquiring, by a network device, duration of a cell working state comprising a semi-static enabled state and/or a dynamic enabled-disabled state, a cell remains in an enabled state within duration of the semi-static enabled state, and the cell switches between an enabled state and a disabled state within duration of the dynamic enabled-disabled state; and
   determining, by the network device, a time for a terminal device to perform measurement and/or synchronization, wherein the time for the terminal device to perform measurement is within a range of duration for which a to-be-measured cell is in a semi-static enabled state and/or a range of duration for which the to-be-measured cell performs signal sending in a dynamic enabled-disabled state, and the time for the terminal device to perform synchronization is within a range of duration for which a serving cell is in a semi-static enabled state.

2. The method according to claim 1, wherein acquiring, by a network device, duration of a cell working state comprises:
   configuring, by the network device, duration of a cell working state of a cell; or
   acquiring, by the network device, duration, configured by an Operation, Administration and Maintenance (OAM) entity, of a cell working state.

3. The method according to claim 2, wherein configuring, by the network device, duration of a cell working state comprises:
   configuring, by the network device, duration of a cell working state of the serving cell according to service information of the serving cell of the terminal device; or
   configuring, by the network device, duration of a cell working state of the serving cell according to received duration of a cell working state of a neighboring cell.

4. The method according to claim 3, wherein after configuring, by the network device, duration of a cell working state of the serving cell, the method further comprises:
   notifying, by the network device, the duration of the cell working state of the serving cell to the neighboring cell.

5. The method according to claim 1, wherein:
   the duration of the cell working state comprises the duration of the working state of the serving cell and the duration of the working state of the neighboring cell;
   working states of the serving cell and an intra-frequency neighboring cell in a first set time period are the same; and
   working states of the serving cell and an inter-frequency neighboring cell in a second set time period are different, wherein the first set time period is a part or all of a time period of the semi-static enabled state of the serving cell, and the second set time period is a part or all of the time period of the semi-static enabled state of the serving cell and a part or all of a time period of a dynamic enabled-disabled state of the serving cell.

6. The method according to claim 1, wherein after determining, by the network device, a time for terminal device to perform measurement and/or synchronization, the method further comprises:
   sending, by the network device to the terminal device, indication information that indicates the time for the terminal device to perform measurement and/or synchronization.

7. The method according to claim 6, wherein the indication information comprises:
   information indicating the duration of the cell working state; and/or
   subframe scheduling information that indicates the time for the terminal device to perform measurement and/or synchronization.

8. The method according to claim 7, wherein:
   the indication information comprises the subframe scheduling information that indicates the time for the terminal device to perform measurement and/or synchronization; and
   the subframe scheduling information comprises a discontinuous reception cycle (DRX) cycle, wherein the DRX cycle comprises an active-state time of the terminal device and an inactive-state time of the terminal device, and the active-state time of the terminal device is within the range of the duration for which the serving cell of the terminal device is in the semi-static enabled state.

9. The method according to claim 7, wherein the indication information comprises subframe scheduling information that indicates the time for the terminal device to perform measurement, wherein the subframe scheduling information comprises information indicating a restrictive measurement subframe set, wherein the restrictive measurement subframe set comprises subframes for instructing the terminal device to perform measurement, and all the subframes in the restrictive measurement subframe set are within the range of the duration for which the to-be-measured cell is in the semi-static enabled state and/or the range of the duration for which the to-be-measured cell performs signal sending in the dynamic enabled-disabled state.

10. A network device, comprising:
    a processor configured to:
       acquire duration of a cell working state comprising a semi-static enabled state and/or a dynamic enabled-disabled state, a cell remains in an enabled state within duration of the semi-static enabled state, and the cell switches between an enabled state and a disabled state within duration of the dynamic enabled-disabled state; and
       determine a time for a terminal device to perform measurement and/or synchronization, wherein the time for the terminal device to perform measurement is within a range of duration for which a to-be-measured cell is in a semi-static enabled state and/or a range of duration for which the to-be-measured cell performs signal sending in a dynamic enabled-disabled state, and the time for the terminal device to perform synchronization is within a range of duration for which a serving cell is in a semi-static enabled state; and
    a transmitter, communicatively connected with the processor, configured to:

send, to the terminal device, indication information that indicates the time for the terminal device to perform measurement and/or synchronization.

11. The network device according to claim 10, wherein the processor is further configured to:
configure the duration of the cell working state of a cell; or
acquire the duration, configured by an Operation, Administration and Maintenance (OAM) entity, of the cell working state.

12. The network device according to claim 11, wherein the processor is further configured to:
configure the duration of the cell working state of the serving cell according to service information of the serving cell of the terminal device; or
configure duration of the cell working state of the serving cell according to received duration of a cell working state of a neighboring cell.

13. The network device according to claim 12, wherein the transmitter is further configured to:
notify the duration of the cell working state of the serving cell to the neighboring cell after the processor configuring the duration of the cell working state of the serving cell.

14. The network device according to claim 10, wherein:
the duration of the cell working state comprises the duration of the working state of the serving cell and the duration of the working state of the neighboring cell;
working states of the serving cell and an intra-frequency neighboring cell in a first set time period are the same; and
working states of the serving cell and an inter-frequency neighboring cell in a second set time period are different, wherein the first set time period is a part or all of a time period of the semi-static enabled state of the serving cell, and the second set time period is a part or all of the time period of the semi-static enabled state of the serving cell and a part or all of a time period of a dynamic enabled-disabled state of the serving cell.

15. The network device according to claim 10, wherein the indication information comprises:
information indicating the duration of the cell working state; and/or
subframe scheduling information that indicates the time for the terminal device to perform measurement and/or synchronization.

16. The network device according to claim 15, wherein:
the indication information comprises the subframe scheduling information that indicates the time for the terminal device to perform measurement and/or synchronization; and
the subframe scheduling information comprises a discontinuous reception cycle (DRX) cycle, wherein the DRX cycle comprises an active-state time of the terminal device and an inactive-state time of the terminal device, and the active-state time of the terminal device is within the range of the duration for which the serving cell of the terminal device is in the semi-static enabled state.

17. The network device according to claim 15, wherein the indication information comprises subframe scheduling information that indicates the time for the terminal device to perform measurement, wherein the subframe scheduling information comprises information indicating a restrictive measurement subframe set, wherein the restrictive measurement subframe set comprises subframes for instructing the terminal device to perform measurement, and all the subframes in the restrictive measurement subframe set are within the range of the duration for which the to-be-measured cell is in the semi-static enabled state and/or the range of the duration for which the to-be-measured cell performs signal sending in the dynamic enabled-disabled state.

18. A terminal device, comprising a receiver, and a processor communicatively connected with the receiver, wherein
a receiver configured to:
receive indication information that is sent by a network device according to duration of a cell working state and that indicates a time for a terminal device to perform measurement and/or synchronization, wherein the cell working state comprises a semi-static enabled state and/or a dynamic enabled-disabled state, a cell remains in an enabled state within duration of the semi-static enabled state, and the cell switches between an enabled state and a disabled state within duration of the dynamic enabled-disabled state; and
a processor, communicatively connected to the receiver, configured to:
determine, according to the indication information received by the receiver, the time to perform measurement and/or synchronization, and perform measurement and/or synchronization within the time to perform measurement and/or synchronization, wherein the time to perform measurement is within a range of duration for which a to-be-measured cell is in a semi-static enabled state and/or a range of duration for which the to-be-measured cell performs signal sending in a dynamic enabled-disabled state, and the time to perform synchronization is within a range of duration for which a serving cell is in a semi-static enabled state.

19. The terminal device according to claim 18, wherein the indication information comprises:
information indicating the duration of the cell working state; and/or
subframe scheduling information that indicates the time for the terminal device to perform measurement and/or synchronization.

* * * * *